(12) United States Patent  (10) Patent No.: US 8,188,356 B2
Rose  (45) Date of Patent: May 29, 2012

(54) SYSTEM TO TEACH MUSIC NOTATION AND COMPOSITION

(76) Inventor: Anita S. Rose, Port Orchard, WA (US)

( * ) Notice: Subject to any disclaimer, the term of this patent is extended or adjusted under 35 U.S.C. 154(b) by 148 days.

(21) Appl. No.: 12/779,930

(22) Filed: May 13, 2010

(65) Prior Publication Data

US 2010/0288105 A1 Nov. 18, 2010

Related U.S. Application Data

(60) Provisional application No. 61/178,331, filed on May 14, 2009.

(51) Int. Cl.
*G09B 15/02* (2006.01)
*G09B 15/00* (2006.01)

(52) U.S. Cl. ......... 84/447; 84/470 R; 84/476; 84/477 R; 84/483.1

(58) Field of Classification Search ............... 84/447
See application file for complete search history.

(56) References Cited

U.S. PATENT DOCUMENTS

| | | | | |
|---|---|---|---|---|
| 145,622 | A * | 12/1873 | Brown et al. | 84/471 R |
| 182,624 | A * | 9/1876 | Alissoff | 355/132 |
| 548,312 | A | 10/1895 | Hays | |
| 621,323 | A | 3/1899 | Chamberlin | |
| 1,114,139 | A | 10/1914 | Hoffmann | |
| 1,172,848 | A | 2/1916 | Valentine | |
| 1,431,529 | A | 10/1922 | Parelle | |
| 1,433,850 | A | 10/1922 | Schnitker | |
| 1,526,547 | A * | 2/1925 | Hughey | 84/471 R |
| 2,447,213 | A * | 8/1948 | Sledge | 84/470 R |
| 3,750,524 | A | 8/1973 | Lee et al. | |
| 3,817,145 | A * | 6/1974 | Cohen | 84/471 R |
| 4,464,971 | A * | 8/1984 | Dean | 84/471 R |
| 4,819,539 | A | 4/1989 | Searing | |
| 6,967,274 | B2 | 11/2005 | Hanington | |
| 7,030,307 | B2 | 4/2006 | Wedel | |
| 7,709,721 | B2 * | 5/2010 | Suganuma | 84/476 |
| 2003/0167902 | A1 * | 9/2003 | Hiner et al. | 84/477 R |
| 2009/0293704 | A1 * | 12/2009 | Neil | 84/471 R |

* cited by examiner

*Primary Examiner* — Anh Mai
*Assistant Examiner* — Christopher Uhlir
(74) *Attorney, Agent, or Firm* — George R. Reardon

(57) ABSTRACT

Musical note tiles, a system for teaching music notation and composition, and associated methods are disclosed. The system includes manipulative musical note tiles. The note tiles are transparent and adapted for use on measure plaques, or like surfaces. The note tiles can adhere to a surface with static cling in one embodiment. Alternatively, the note tiles can adhere to a surface with magnetism. The note tiles are mathematically proportionate to each other as they are to the relative lengths of sound durations represented by note icons. The measure plaques are in complete mathematical congruence to the lengths of the note tiles. The note tiles can include transparent texture strips. The system also includes mounting platforms, staff extension plaques, grand staff brace labels, bridges, spacer tiles, pre-reading tiles, and symbol labels.

20 Claims, 35 Drawing Sheets

Adagio    Allegro

Andante    Lento

Moderato    Presto

Vivace

SYSTEM TO TEACH MUSIC NOTATION AND COMPOSITION

CROSS-REFERENCE TO RELATED APPLICATION(S)

The present non-provisional patent application claims the benefit of priority of U.S. Provisional Patent Application No. 61/178,331, which is entitled "SYSTEM TO TEACH MUSIC NOTATION AND COMPOSITION", which was filed on May 14, 2009, and which is incorporated in full by reference herein.

FIELD OF THE INVENTION

The technology described herein relates generally to the fields of music and teaching music notation and composition. More specifically, this technology relates to a system and associated methods to teach music notation and composition to students utilizing manipulative note tiles that are transparent, magnetized, and mathematically proportionate to each other and to the relative lengths of sound durations represented by the notes inscribed on the tiles.

BACKGROUND OF THE INVENTION

Young children are now required, according to national and state standards, to read, notate, compose and arrange music using Italian terminology and conventional symbols. Deficiencies and limitations exist in known instruction methods to teach a music student music composition and notation.

Related patents known in the background art include the following: U.S. Pat. No. 548,312, issued to Hays on Oct. 22, 1895, discloses a musical game device. U.S. Pat. No. 621,323, issued to Chamberlin on Mar. 21, 1899, discloses game cards for teaching music. U.S. Pat. No. 1,114,139, issued to Hoffmann on Oct. 20, 1914, discloses an educational game. U.S. Pat. No. 1,172,848, issued to Valentine on Feb. 22, 1916, discloses an instructive game. U.S. Pat. No. 1,431,529, issued to Parelle on Oct. 10, 1922, discloses musical instruction blocks. U.S. Pat. No. 1,433,850, issued to Schnitker on Oct. 31, 1922, discloses an educational apparatus. U.S. Pat. No. 3,750,524, issued to Lee et al. on Aug. 7, 1973, discloses a musical game puzzle. U.S. Pat. No. 4,819,539, issued to Searing on Apr. 11, 1989, discloses a music teaching system and apparatus. U.S. Pat. No. 6,967,274, issued to Hanington on Nov. 22, 2005, discloses a system and method for teaching music. U.S. Pat. No. 7,030,307, issued to Wedel on Apr. 18, 2006, discloses a music teaching device and method.

The foregoing patent information reflects the state of the art of which the inventor is aware and is tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's claimed invention.

BRIEF SUMMARY OF THE INVENTION

In various exemplary embodiments, the technology described herein provides for music notation using manipulative Note Tiles that are transparent, magnetized, and mathematically proportionate to each other and to the relative lengths of sound durations represented by the notes inscribed on the tiles. Moreover the said Note Tiles adhere magnetically to a plurality of staved and unstaved Measure Plaques that are also in complete congruence with the lengths of the Note Tiles. The Measure Plaques, in turn, magnetically adhere to metallic whiteboard Platforms which allow several Measure Plaques to be transported intact and attached to a wall or other surfaces.

In one exemplary embodiment, the technology described herein provides a music note tile used to teach music notation and composition. The note tile includes: a transparent tile to teach music notation and composition, the tile configured with at least one musical note representation disposed opaquely upon the transparent tile and adapted for operative manipulation by a user and placement upon a measure plaque having a rhythmic side and a melodic side into a correct musical position such that, on the melodic side of the measure plaque, the note tile overlays either a staff line or space, and on the rhythmic side of the measure plaque, the tile is positioned between flanking bar lines, wherein the tile is mathematically proportionate in size to a relative length of a sound duration represented by the note inscribed on the tile.

The note tile also can include at least one magnet disposed upon the tile on a back side of the tile and placed directly behind an opaque note area and adapted to couple the tile securely to the measure plaque.

The note tile also can include a hole disposed within a back side of the transparent tile and adapted for placement of the magnet within with hole such that the magnet is flush with the tile.

In at least one embodiment, the transparent note tile is manufactured of a very thin transparent material such that the transparent tile has a thickness of seven millimeters or less and is adapted to adhere to the measure plaque, a projector, a dry-erase board, or like surface, with static cling.

The note tile further can include at least one transparent texture strip disposed upon a back side of the tile and adapted to prevent rotation of the tile on the measure plaque, or like surface, and to maintain alignment of the tile.

The note tile also can include at least one engraving disposed within the tile on a surface where the at least one opaque musical note representation is placed, such that the note shape also is identifiable by sight-impaired and kinesthetic persons.

The note tile further can include at least one horizontal dotted line locating bracket disposed, the horizontal dotted line locating bracket disposed upon a right or left edge of the tile; and at least one horizontal solid line locating strip, the horizontal solid locating strip disposed upon a right or left edge of the tile; wherein the horizontal dotted line locating bracket and the horizontal solid line locating strip are configured to assist the user in a placement of the note tile upon stafflines and spaces of the measure plaque.

In another exemplary embodiment, the technology described herein provides a system to teach music notation and composition. The system includes: a plurality of two-sided measure plaques, each measure plaque having a rhythmic side configured with a time signature, a plurality of beat delineation lines, a plurality of beat units, and a plurality of icons to represent where each beat begins and ends, the rhythmic side adapted for building rhythmic compositions without tonal variations, and a melodic side configured, additionally, with five staff lines and four spaces, the melodic side adapted for building melodic compositions; and a plurality of transparent tiles to teach music notation and composition, the tiles configured with at least one musical note representation disposed upon the transparent tile and adapted for operative manipulation by a user and placement upon the melodic side of the measure plaque into a correct musical position such that the note tile overlays either a staff line or space on the measure plaque or upon the rhythmic side of the measure plaque between flanking bar lines, wherein the tile is mathematically proportionate in size to a relative length of a sound duration represented by the note inscribed on the tile.

In at least one embodiment of the system, each measure plaque comprises a magnetic front and a magnetic back surface, and each transparent note tile comprises a magnet to adhere to one of the measure plaques.

The system also can include a staff extension plaque configured to add additional staff space to the measure plaque.

The system further can include a grand staff brace label configured to join a bass stave and a treble stave into a single system.

The system also can include a magnetic platform adapted to receive the measure plaques, the note tiles, at least one staff extension plaque, and at least one label. The magnetic platform can include a lip adapted to support the measure plaques, the note tiles, the at least one staff extension plaque, and the at least one label.

The system further can include a plurality of magnetic platforms adapted to receive the measure plaques, the note tiles, at least one staff extension plaque, and at least one label; and at least one bridge configured to join a pair of magnetic platforms.

The system also can include a plurality of spacer tiles, each spacer tile adapted for use between note tiles and to support and level note tiles.

The system also can include a plurality of pre-reading tiles, each tile having an image adapted for view by a pre-reader or emerging reader, wherein the image represents a pneumonic symbol.

The system further can include a plurality of symbol labels adapted for adherence to the measure plaque, each label indicative of a musical term.

The system also can include a plurality of Solfeggio labels.

In yet another exemplary embodiment, the technology described herein provides a method to teach music notation and composition. The method includes: providing a plurality of two-sided measure plaques, each measure plaque having a first side configured with a time signature, a plurality of beat delineation lines, a plurality of beat units, and a plurality of icons to represent where each beat begins and ends, the first side adapted for building rhythmic compositions without tonal variations, and a second side configured, additionally, with five staff lines and four spaces, the second side adapted for building melodic compositions; providing a plurality of transparent tiles to teach music notation and composition, the tiles configured with at least one musical note representation disposed upon the transparent tile and adapted for operative manipulation by a user and placement upon the melodic side of the measure plaque into a correct musical position such that the note tile overlays either a staff line or space on the measure plaque or upon the rhythmic side of the measure plaque between flanking bar lines, wherein the tile is mathematically proportionate in size to a relative length of a sound duration represented by the note inscribed on the tile; utilizing the first side of the measure plaque to compose a rhythmic composition; and utilizing the second side of the measure plaque to compose a melodic composition.

An object of the technology described herein is to provide a notation system to teach music notation and composition, thereby increasing music student's success and ability to understand and easily compose music, particularly since young children are now required by U.S. and state standards, to read, notate, compose and arrange music using conventional symbols and Italian terminology.

Another object of the technology described herein is to provide a system of thick, transparent Note Tiles that look similar to glass tiles with music symbols painted onto them. The user of this system will select any given Note Tile and can slide it up, down or sidewise over a given Measure Plaque until the inscribed note overlays a staff line or space on the Measure Plaque. From a distance then, a painted note on any transparent Note Tile looks roughly like a note painted directly onto a staff, in much the same way a car window decal can be laid over a window graphic, giving the appearance of one complex picture rather than two simpler pictures. This ability to see through the Note Tiles so that they can be precisely positioned as an overlay on top of the lines and spaces of the Melodic Measure Plaques is an important feature of this system, since music composition requires precision in the rendering of notes on lines and spaces. Another object is to provide a notational teaching system that can remain intact for composition and teaching purposes. The key elements of this system adhere magnetically to each other, creating an easy-to-use, durable system of that both children and adults may use that does not easily fall apart. The Measure Plaques in this system, for example, are comprised of magnetic whiteboard and the backs of the Note Tiles also have magnets. Together this system enables the users to sit on the floor, at a table, or stand next to the wall-mounted Platforms and magnetically affix their Note Tiles on one or more Measure Plaques. When users have assembled their composition, they are able to easily lift and transport their completed Measures Plaques and Platforms to their destination without worrying that their compositions might slide to the ground and ruining their efforts. Similarly, music teachers often need to demonstrate music theory and composition to classes in various rooms or parts of the classroom. A system that allows them to quickly assemble and/or remove a vast plurality of notes and symbols, and that enables them to safely transport notes, motifs or compositions, is a system that almost any music teacher would treasure.

Another object is to provide a notation system that is completely tactile as well as visual, a feature that is particularly important when children are learning concepts. "A significant research base has proven that while using manipulatives, student attention is increased and the children are highly engaged in the instruction being delivered. Retention is enhanced due to the game-like nature of the activities." (Heritage Music Press) The engraved lines on the flanking sides of every Note Tile and Measure Plaque facilitate the accurate placement of music notes onto staff lines and spaces. The length of each Note Tile is also exactly proportionate to the length of that note's sound duration. Ordinarily, young students have a very difficult time calculating the relative values of notes, especially dotted notes. In this system, however, because it uses proportionate manipulatives, a person of almost any age can build one or more measures of rhythms in a matter of minutes.

Another object is to provide a notation system that is self-instructive. The student, when building a musical measure using said Note Tiles, can immediately see and feel if their selected notes fill a measure's allocated space, i.e., the area between the two adjacent bar lines which define a measure. Moreover, each type of Measure Plaque has easy-to-read inscriptions on it, denoting its time signature and the correct number of beats for that measure, further informing the user about the measure he or she is using.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the technology described herein. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Figure 1:
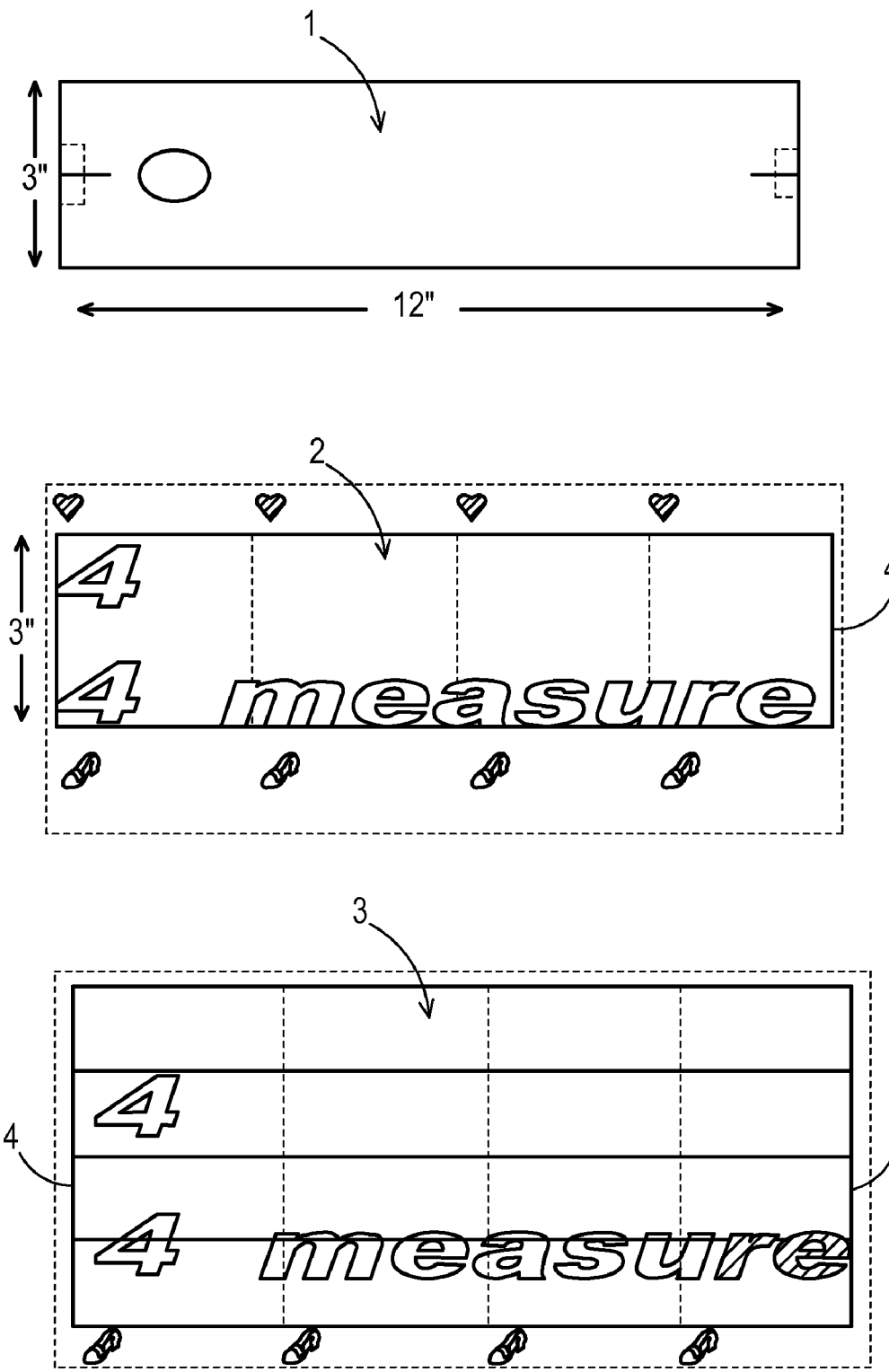
FIG. 1 is a front schematic view of a whole note tile, 4-4 rhythmic measure plaque, and 4-4 melodic measure plaque, according to an embodiment of the technology described herein.

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides a system and associated methods to teach music notation and composition to students utilizing manipulative note tiles that are transparent, magnetized, and mathematically proportionate to each other and to the relative lengths of sound durations represented by the notes inscribed on the tiles. This is particularly useful since young children are now required, according to national and state standards, to read, notate, compose and arrange music using Italian terminology and conventional symbols.

Turning now descriptively to the drawings, in which similar reference characters denote similar elements throughout the several views, the figures illustrate manipulative musical Note Tiles that are transparent and magnetized, mathematically proportionate to each other and to the relative lengths of sound durations represented by the notes inscribed on the tiles. Moreover the said Note Tiles adhere magnetically to a plurality of Measure Plaques, which are in complete mathematical congruence with the lengths of the Note Tiles.

Transparent And Magnetic Note Tiles

The lengths of the Note Tiles are directly proportionate to the duration of the type of notes that are inked on the front of each tile. The transparency of each Note Tile allows Beat Delineations 30, Beat Units 30a, staff lines and all other demarcations of the Melodic Measure Tiles to be clearly seen when they are placed on top of the Measure Plaques.

Figure 19:
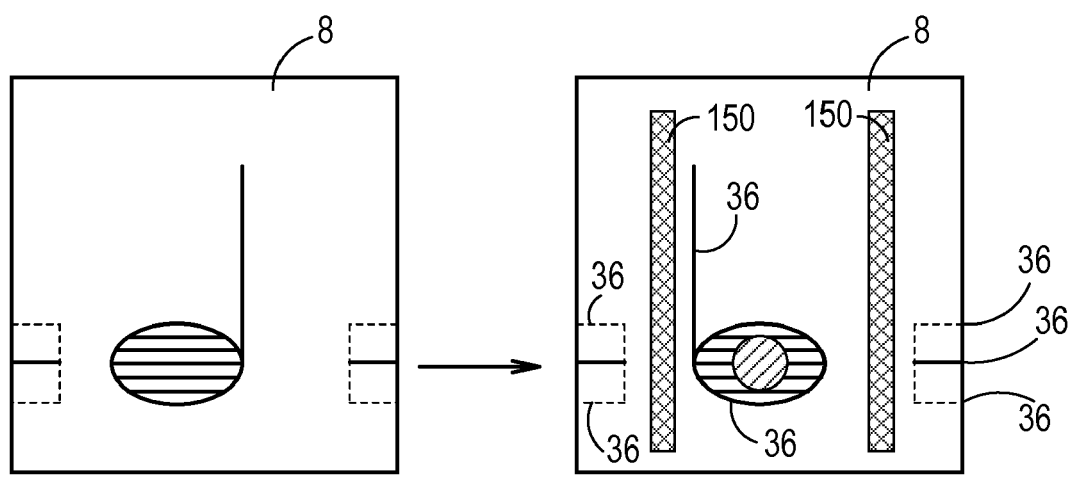
FIG. 19 is a front schematic view of the magnetic joining of note tiles, according to an embodiment of the technology described herein.

The magnetic areas on the back sides of said Note Tiles magnetically attach the notes to Measure Plaques (FIG. 19).

Shown Note Tiles are made of durable and transparent acrylic-type materials, and are engraved wherever they are inked on their front surfaces in order to inform sight-impaired and/or kinesthetic students about the musical notes' shape. Locating Brackets 5 and Strips 6 assist users with their accurate placement of said notes upon stafflines and spaces of the staved measure underneath them.

In an alternative embodiment, the note tiles are comprised of a very thin transparent material to create a static cling. By way of example, a tile having a thickness of seven millimeters or less can cling to a surface.

In yet another alternative embodiment, the note tiles are adapted to adhere to a magnetic dry-erase board and can include, for example, construction of thick magnetic vinyl.

Two-Sided Measure Plaques

Figure 11:
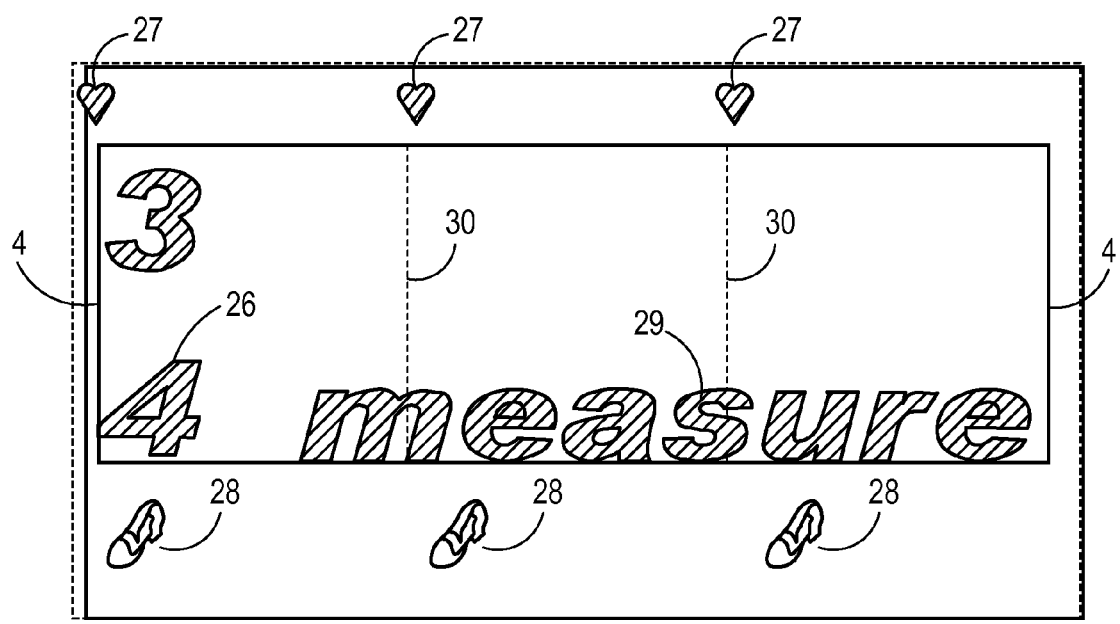
FIG. 11 is a front schematic view of a three-four rhythm measure plaque, according to an embodiment of the technology described herein.
Figure 13:
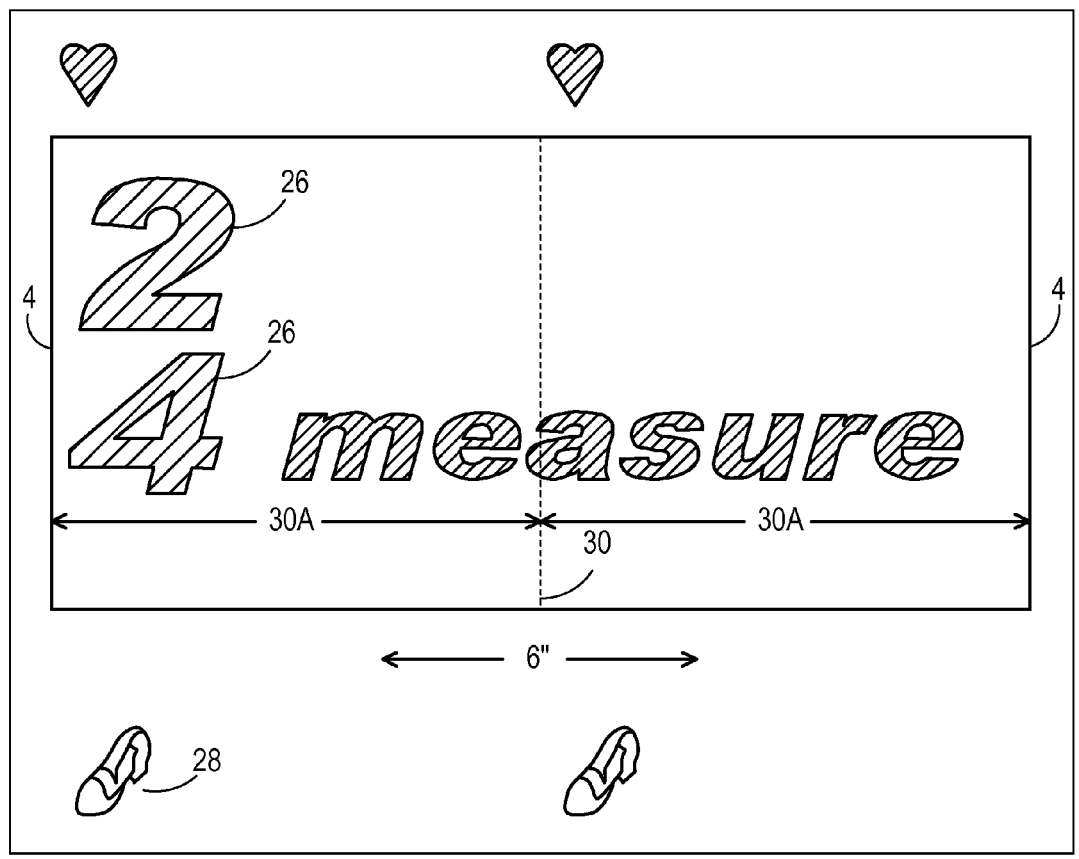
FIG. 13 is a front schematic view of a two-four rhythm measure plaque, according to an embodiment of the technology described herein.
Figure 15:
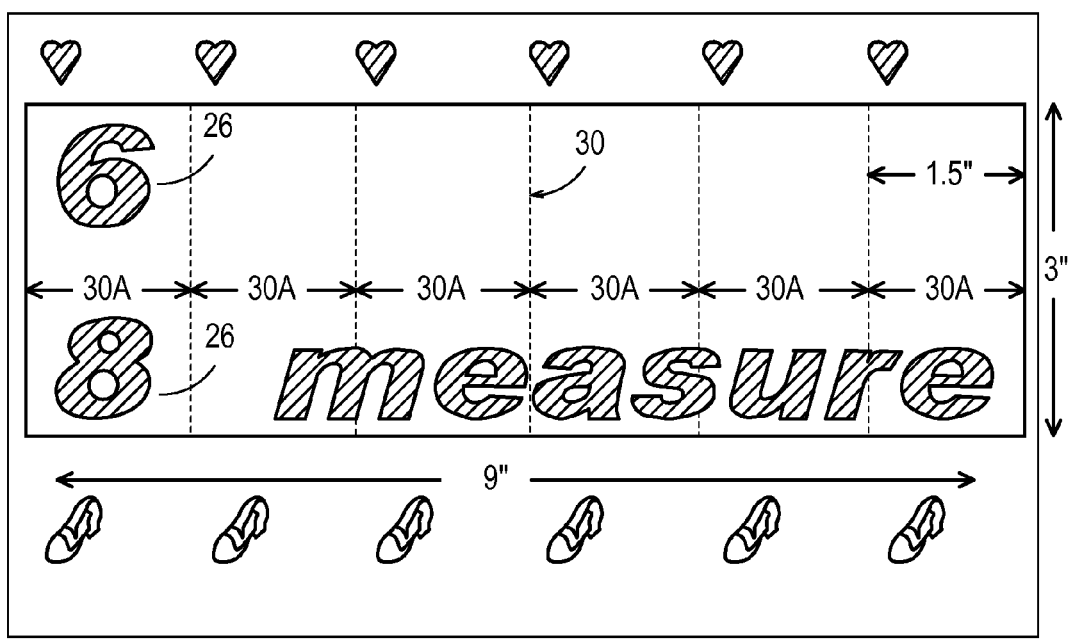
FIG. 15 is a front schematic view of a six-eight rhythm measure plaque, according to an embodiment of the technology described herein.

The measurements of shown Beat Units and Measure Plaques correlate directly with the lengths all Note Tiles. In this relative relationship, the lengths of all Note Tiles, Beat Units and Measure Plaques reveal the connection between note values, beats and time signatures that are inscribed on all Measure Plaques. Every Measure Plaque, except FIG. 27, has two sides: one side is for the building of rhythmic phrases is seen in FIGS. 11, 13, 15. This rhythmic side reveals icons of hearts and shoes at the beginning of every beat to show where each beat begins and ends. Shown Beat Units 30a—the area between two adjacent Beat Delineation Lines 30 (or the area between a Beat Delineation Line 30 and any adjacent Bar Line 4), represents one beat. The top number of the Time Signature 26 in each Measure Plaque is equal to the number of Beat Units 30a in that measure. The bottom number of the Time Signature corresponds to the value of the note that receives one beat in that particular measure. It will be apparent to one of ordinary skill in the art upon reading this disclosure, that alternative, more complex, time signatures and corresponding measures can be utilized in addition to those depicted in the drawings. By way of example, time signatures of 3/16 and 2/2 can be utilized in alternative time signature embodiments.

The other side of these Measure Plaques (i.e. FIGS. 4, 12, 14, and 16) shows, additionally, five staff line and four spaces upon which said Note Tiles may be magnetically affixed. As with the Note Tiles, the aforesaid Measure Plaques are engraved wherever there are inked inscriptions. This allows tactile and vision-impaired students to put notes onto the precise locations of staff lines or spaces. For example, when a seeing-impaired user places the engraved a Note Tile's Dotted Locating Brackets 5 (see FIGS. 4-5) directly on top of two adjacent staff lines on a Measure Plaque, the resulting note will be accurately depicted as a space note (see FIGS. 3 & 5). Similarly, when the user places a Note Tile's flanking Solid Locating Strips 6 (see FIG. 3) directly upon an engraved staff line of the Measure Plaque beneath it, the note is clearly rendered as a line note. The Measure Plaques are magnetic on both sides. All Note Tiles and Platforms will easily attach themselves to either side of these Plaques. Finally, the manipulative nature of Note Tiles on these Measure Plaques, in conjunction with their building-block attributes, helps to turn abstract music theory concepts into a building-block-like composition games for users of all ages. The system is user friendly to users of all levels. Preschoolers can build iconic beet, apple, and gum patterns on the same Rhythm Measure Plaques that advanced students create highly-complex polyrhythms. The aforesaid Note Tiles and Measure Plaques, Labels (FIG. 20, 21, 26, 28, 29, 32-34), and other system features (FIG. 22, 23, 24, 30, 31-34) all serve to maximize the versatility within this system. One may see this versatility demonstrated in FIGS. 2, 3, 5, and 35.

Platforms and Bridging Devices

When a plurality of Measure Plaques are juxtaposed, either horizontally or vertically or both, aforesaid Mounting Platforms provide a stable, and supportive and magnetic surface upon which a user can situate multiple Measure Plaques, Note Tiles, Staff Extension Plaques, and Labels.

These Platforms and linking Bridges allow the plurality of facets in this notation system to remain intact when they are transported to other spaces, mounted on walls, or magnetically attached to magnetic surfaces such as large white boards.

Spacer Tiles

The Spacer Tiles 81-82 are comprised of the same clear acrylic-like materials as the Note Tiles. Spacer Tiles are about 1"×2" (25.4 mm×50.8 mm) and can be sandwiched between two horizontal Note Tiles, serving to support and level the top Note Tiles, thereby preventing them from losing their magnetic adherence. Since Spacer Tiles are magnetized on the fronts and backs, a plurality of notes may be clustered or stacked without problems of tipped and uneven magnetic surfaces.

Staff Extension Plaques

The Staff Extension Plaques are made of the same materials as Measure Plaques and are created to allow a stave to be extended, thereby providing space for items like clefs and accidentals that must be situated to the left of an initiating measure of a piece. Moreover, these Extension Plaques provide needed space within a composition for key changes, multiple verse endings, partial measures, or other types of irregular staff spacings.

Connections of Main Elements and Sub-Elements of Invention

Due to the fast-paced and concentrated nature of modern standards-driven music classrooms which switch between beginning to advanced classes with minutes, music teachers need theory and composition systems that are easy to use, highly versatile durable, fun, and self-teaching. When a music teacher uses this Notation and Composition System, he or she can switch a notational display from a very simple rhythmic passage to a sophisticated passage—in seconds—by replacing several simple Note Tiles with more complex ones. Further, individual notes, measures or symbols can be displayed singularly or as a small group so that a class may work with specific symbols.

On the other hand, users—such as students—love to use this notation system for playing music identification games, creating compositions, reading music, or for any of the above—and are able to do so with very few directions from their teacher because the system makes perfect mathematical, visual and tactile sense. Once users create a phrase or composition using this system, they can sing or play it either on a horizontal or vertical surface, they may copy their compositions onto paper, or they can put their compositions up on a white board for their classmates to play and enjoy. Other students may wish to add their own compositions onto the first in order to create multiple voicings or parts. This system truly is a win-win for everyone in the music studio or classroom.

Alternative Embodiments of the Technology

The magnetic materials used to attach said Note Tiles may be altered in the future as new materials are produced that better user needs. Cling labels may be created with other types of resilient materials which might be better suited for the purposes noted above. The Platforms, Bridges and Measure Plaques likewise may be built of other materials upon which Note Tiles and Labels might be temporarily affixed. That is to say, all tiles, plaques, platforms and other accompanying parts in this notation system may someday be manufactured with materials that better serve the functions cited, or they may be less costly.

Operation of Preferred Embodiment

Figure 22:
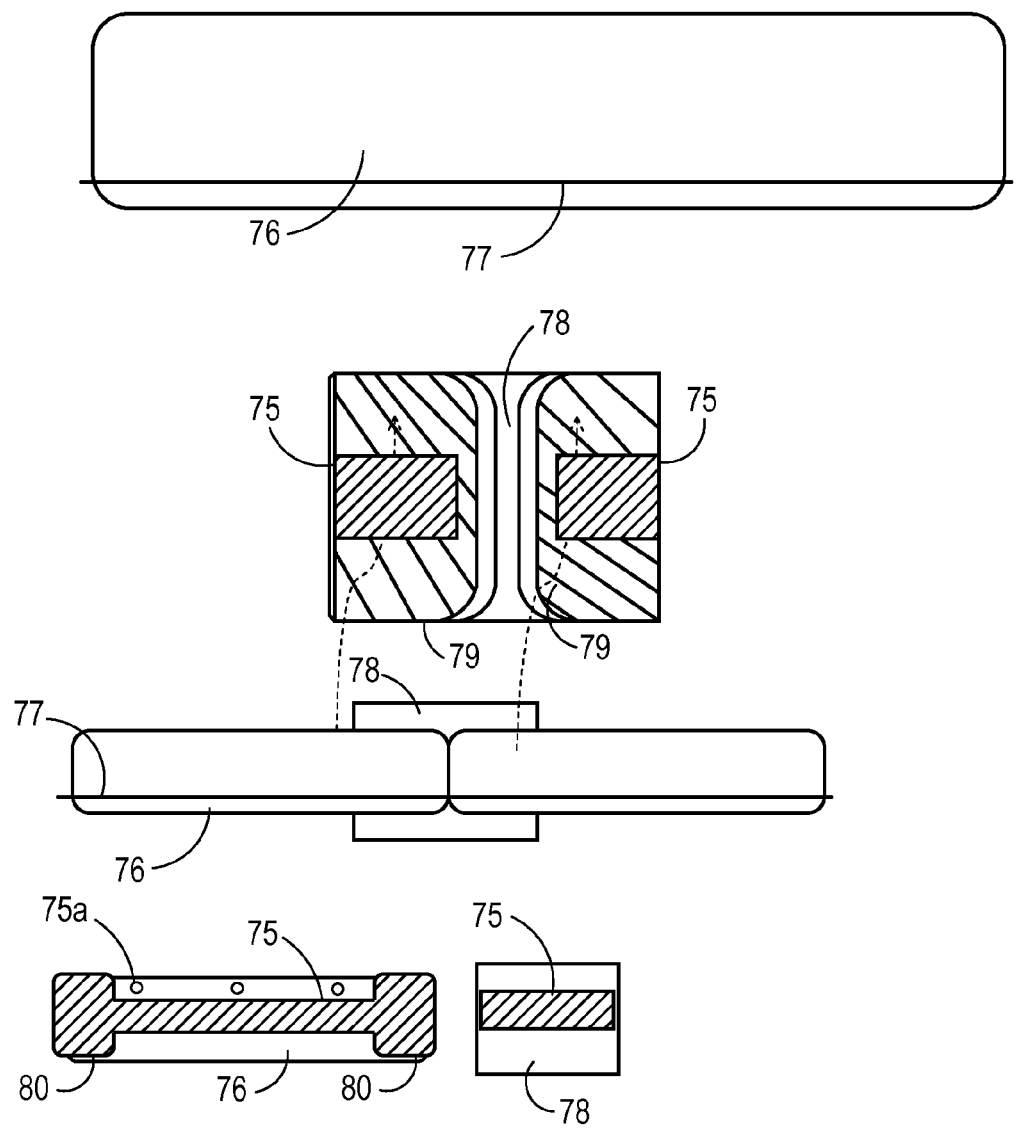
FIG. 22 is a front and back schematic view of a platform and bridging device, according to an embodiment of the technology described herein.

Rhythmic Compositions: The user will select a Rhythm Measure Plaque (FIG. 11, 13, or 15) and place it onto Platform 76. The user will then select from a plurality of Note Tiles and will place one or more of these Tiles on the Rhythm Measure Plaque so that they are in line with one another (see FIGS. 10a and 35). The selected Note Tiles should be placed between Bar Lines 4 in a manner that they can abut each other, and take up all the area between said Bar Lines so that no discernable spaces exist between them, or between any Note Tiles and adjacent Bar Lines. Furthermore, none of the Note Tiles should extend over either of the flanking Bar Lines 4 in a Measure Plaque. If the user wishes to make his composition longer, then another Measure Plaque of the same Time Signature can be juxtaposed directly against the right hand side of the first Plaque. This process can be repeated as desired. If the plurality of Measure Plaques take up more space than is allocated on one Platform 76, then another Platform 76 can be added to the right of the first. If the two Platforms need to be bridged in order for the parts to be moved safely as one unit to a wall surface, then the Platforms can be linked by Bridge Unit 78 as seen in FIG. 22.

Uses for Rhythm Measure Plaques: Once the selected Notes Tiles have been arranged on Rhythmic Measure Plaques and Platforms, then the user may then do the following with the composed rhythmic motif: a) copy his or her composition onto paper, b) play or articulate the composition using voice, body or other percussion instruments, c) encourage others to play or articulate them, d) make up games or exercises, e) add a similar rhythmic composition directly above or below the first, thus creating polyrhythms, f) add Labels to the composition to show nuances, tempos, instrumentation or phonemes to the rhythmic composition, or g) any or all of the above in any combination.

Figure 31:
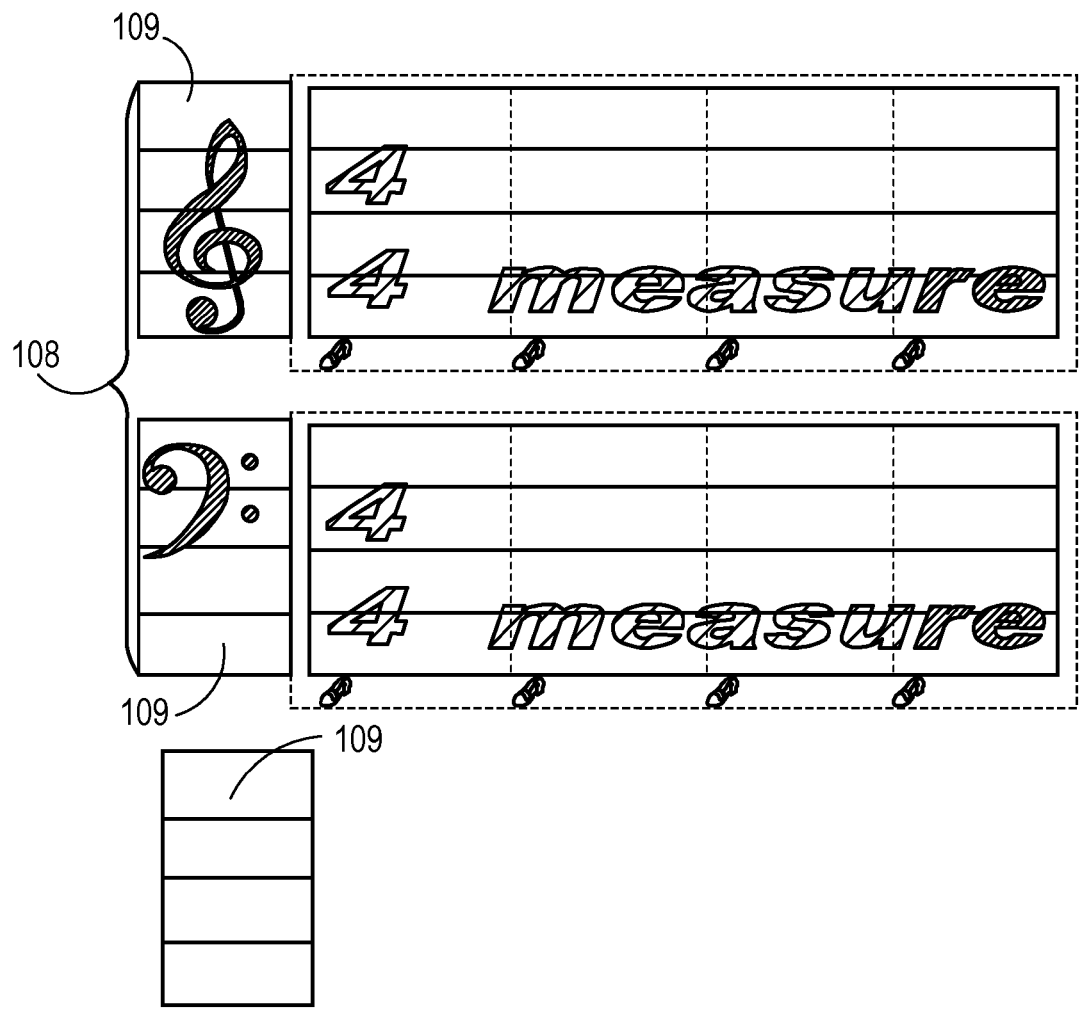
FIG. 31 is a front schematic view of a grand staff brace and staff extension plaque, according to an embodiment of the technology described herein.

Melodic Compositions: Single Stave Melodic Composition: Uses for Melodic Measure Plaques for a single voicing: As was seen in the Rhythmic Compositions, a user will place before him/her Platform 76. With a melodic composition, however, the user will also need to select one or more Staff Extension Plaques 109 to place on the left-most side of the Platform, placing the Plaque(s) directly above the Platform's Lip 77. The user will then select one Clef Label from Labels 37-39 and will press the chosen Clef into the center of the Staff Line Plaque, as seen in FIG. 31. An additional Staff Extension Plaque may be positioned to the right of the first Measure Plaque for the placement of Sharps 51 or Flats 52 Labels.

Figure 3:
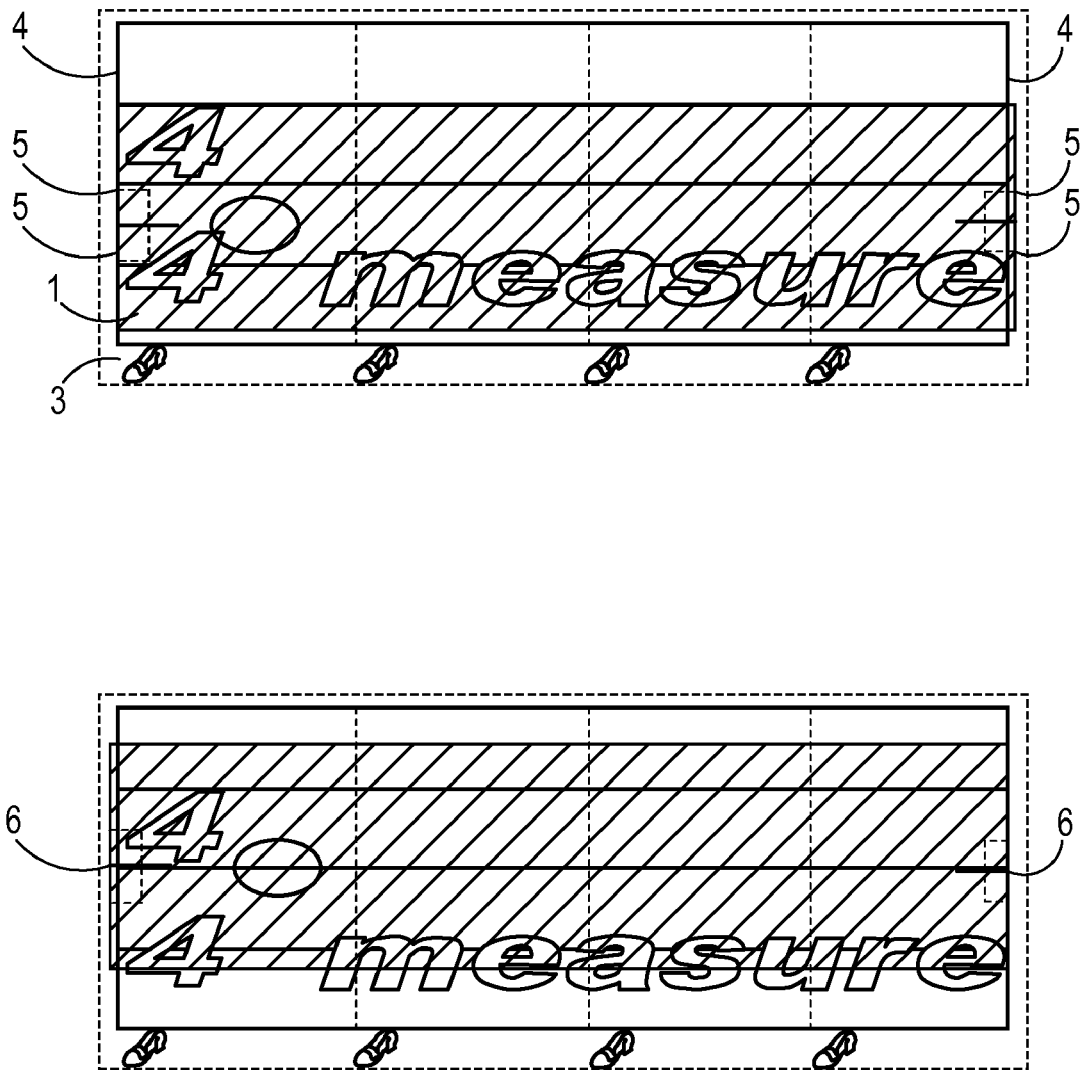
FIG. 3 is a front schematic view of a whole note tile in a staff space and a whole not tile on a staff line, according to an embodiment of the technology described herein.
Figure 4:
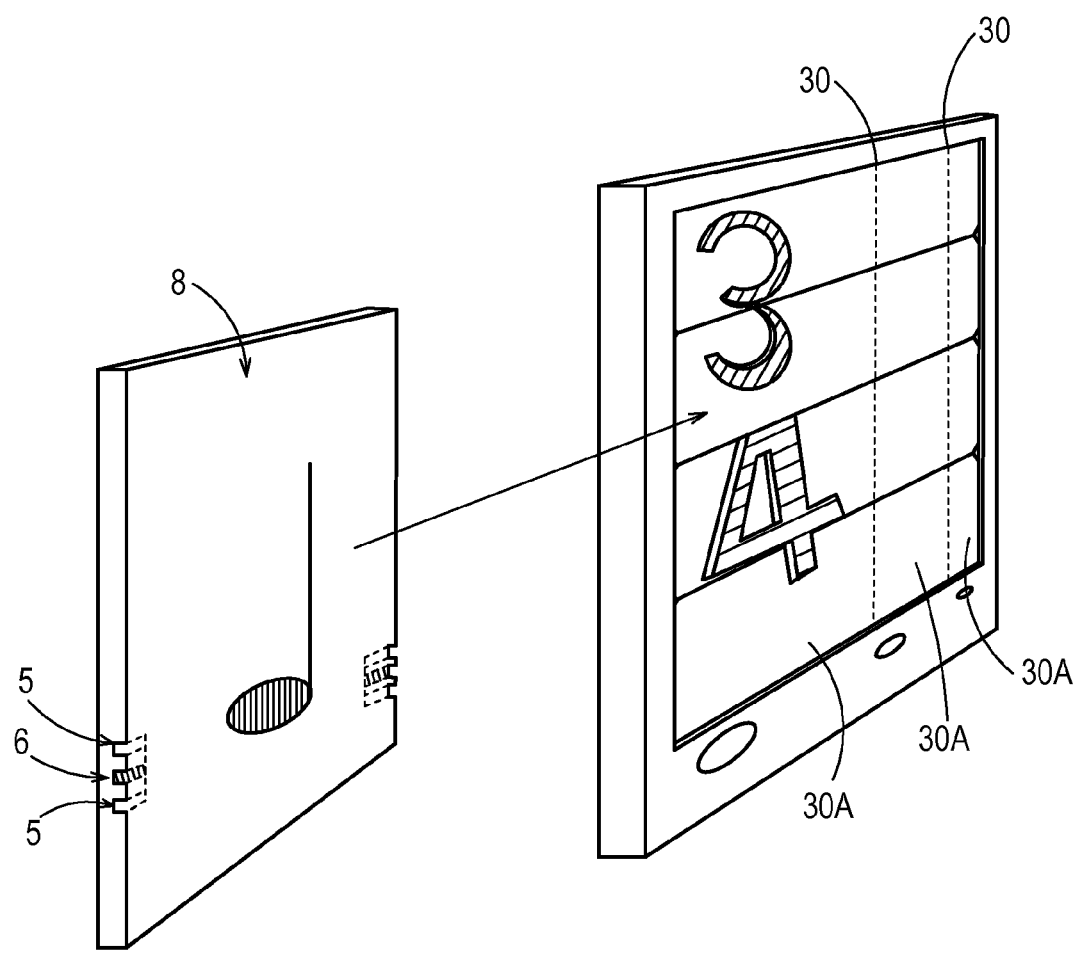
FIG. 4 is a side perspective view of a quarter not tile, according to an embodiment of the technology described herein.
Figure 32:
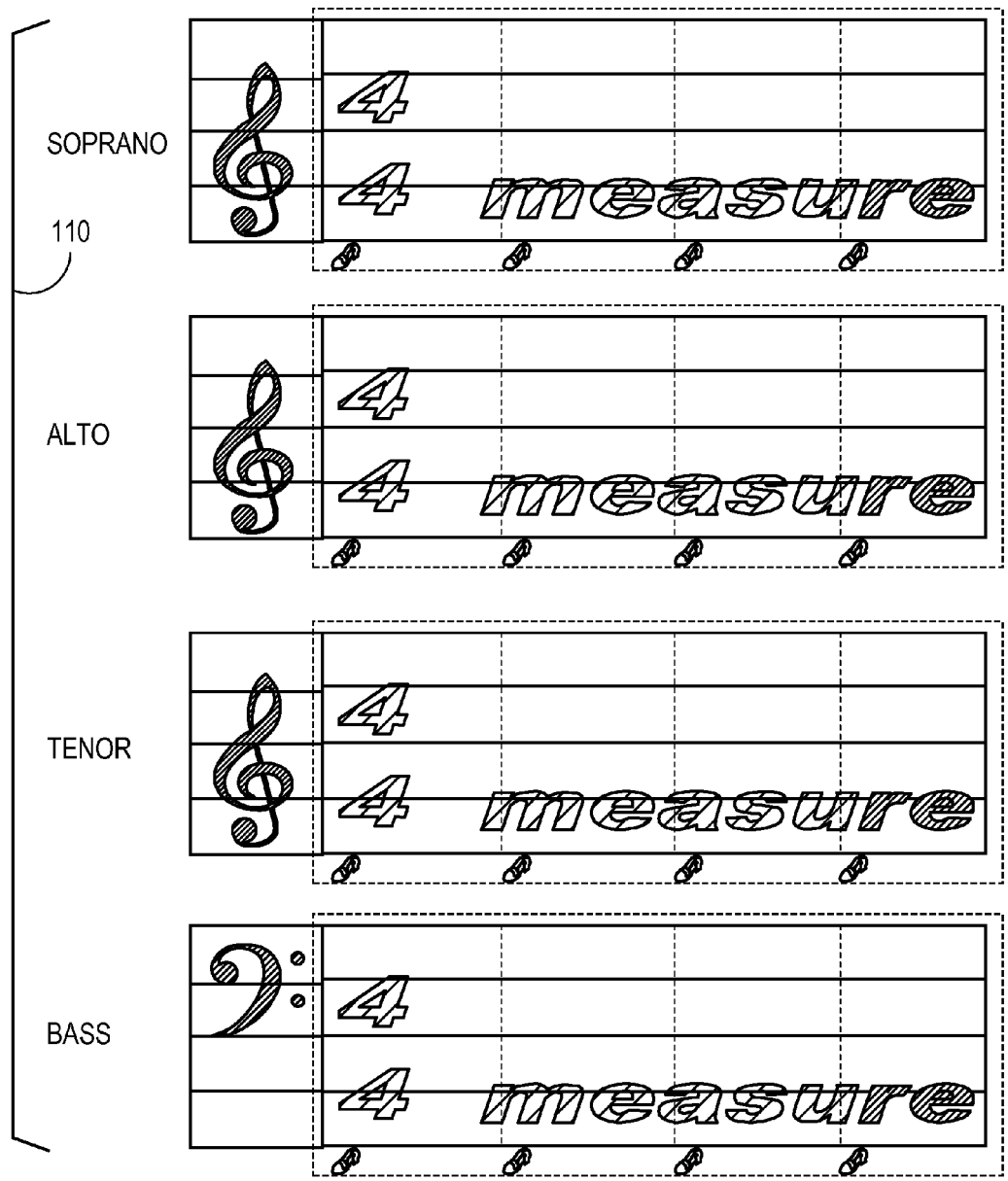
FIG. 32 is a front schematic view of a bracket label with multiple voicings on measure and spacer plaques, according to an embodiment of the technology described herein.

The user can then select a Melodic Measure Plaque (FIG. 12, 14, 16) and will proceed to line up the staff lines of the Staff Extension Plaque 109 with the staff lines of the Measure Plaque, as seen in FIGS. 31 and 32 (all staff lines are both engraved for additional placement accuracy). The user will then select Note and Rest Tiles from FIGS. 6-10 and will compose a melody by placing a notes onto the Melodic Measure Plaques in one or two ways: 1) he/she can place the Note Tiles as he/she sees fit, making sure that the Note Tiles do not extend beyond the Bar Lines 4, and/or 2) (particularly for vision-impaired or highly kinesthetic users) he/she may choose to place note kinesthetically in this manner: a) When the user wishes to place a note onto a particular staff space, he/she would use feel the inscribed Dotted Locating Brackets 5 on the Note Tile (e. g. FIG. 4) and would place the edges of said Locating Brackets directly on top of the staff lines adjacent to the space. When said Brackets are aligned on top of these engraved staff lines, the resulting note will then be correctly seen as space note, as shown in the top example of FIG. 3 and in the example of FIG. 5. If, however, the user desires to kinesthetically place a note on a staff line, he/she will line up the Solid (and engraved) Locating Strips 6 on the sides of the Note Tile (e. g. FIG. 4) so that the vectors of the Strips can be felt to be in line with the selected staff line.

Additional labels, plaques or tiles (FIG. 20-21, 26, 28-31, 33-34) may be appended to the Note Tiles and Measure Plaques for more precise or sophisticated rendering. Uses of the above Melodic Compositions would be the same as the Rhythm Compositions, but would also include the use of vocal or tonal instruments in their rendering.

Figure 35:
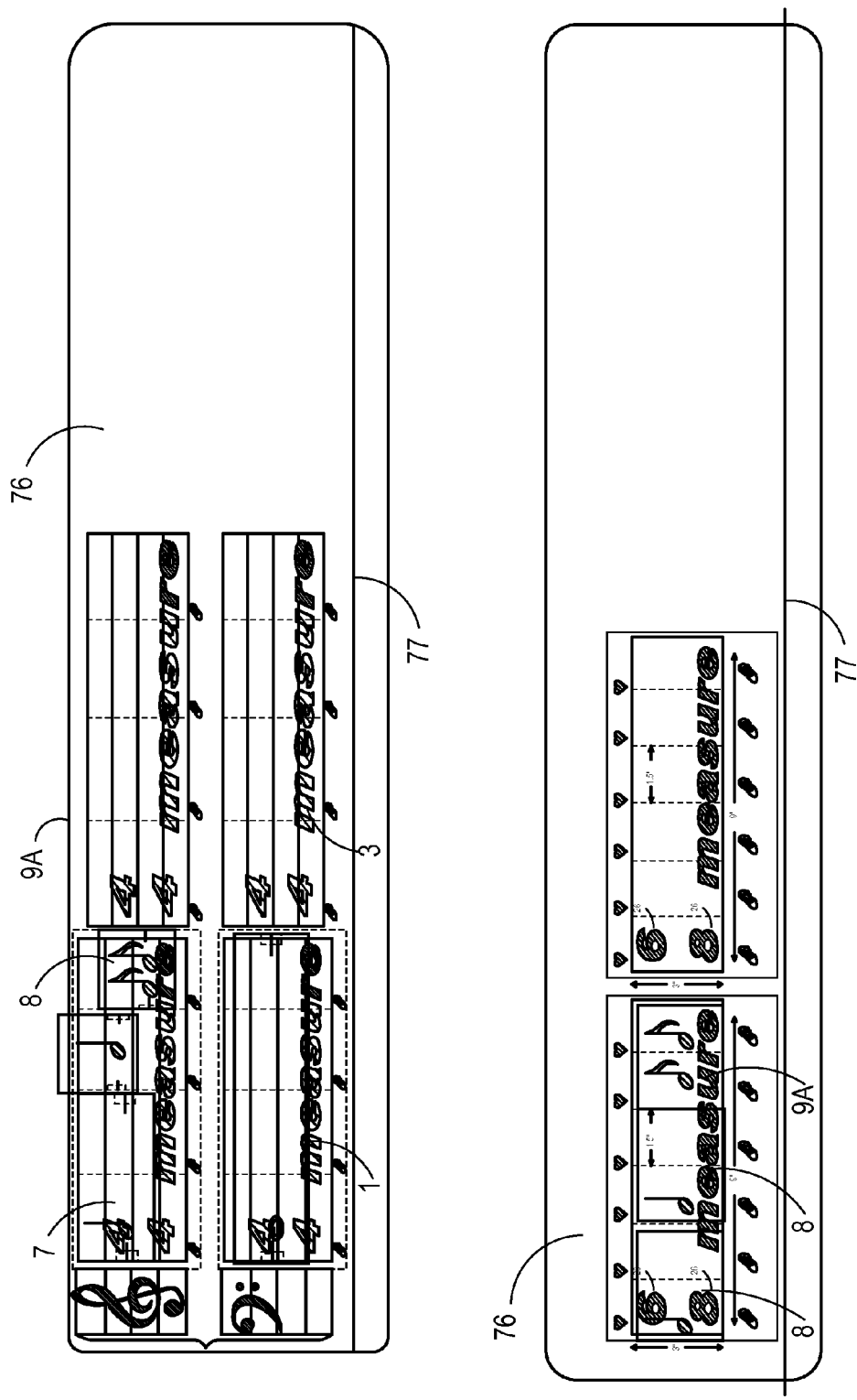
FIG. 35 is a front schematic view demonstrating note tiles and labels on measure plaques and platforms, according to an embodiment of the technology described herein.

Polyphonic Compositions: The formation of Polyphonic Compositions would be similar to the Single Stave Melodic Composition except that the placement of the Platforms, Measure Plaques, Staff Line Plaques, Note Tiles and Labels would be conceived and built vertically as well as horizontally, as shown in FIGS. 32 and 35. The methods for creating Polyphonic Compositions would be the same as the uses of the Rhythmic and Single Line Melodic Compositions but even more precise vocal and instrumental sophistication would be required.

Figure 2:
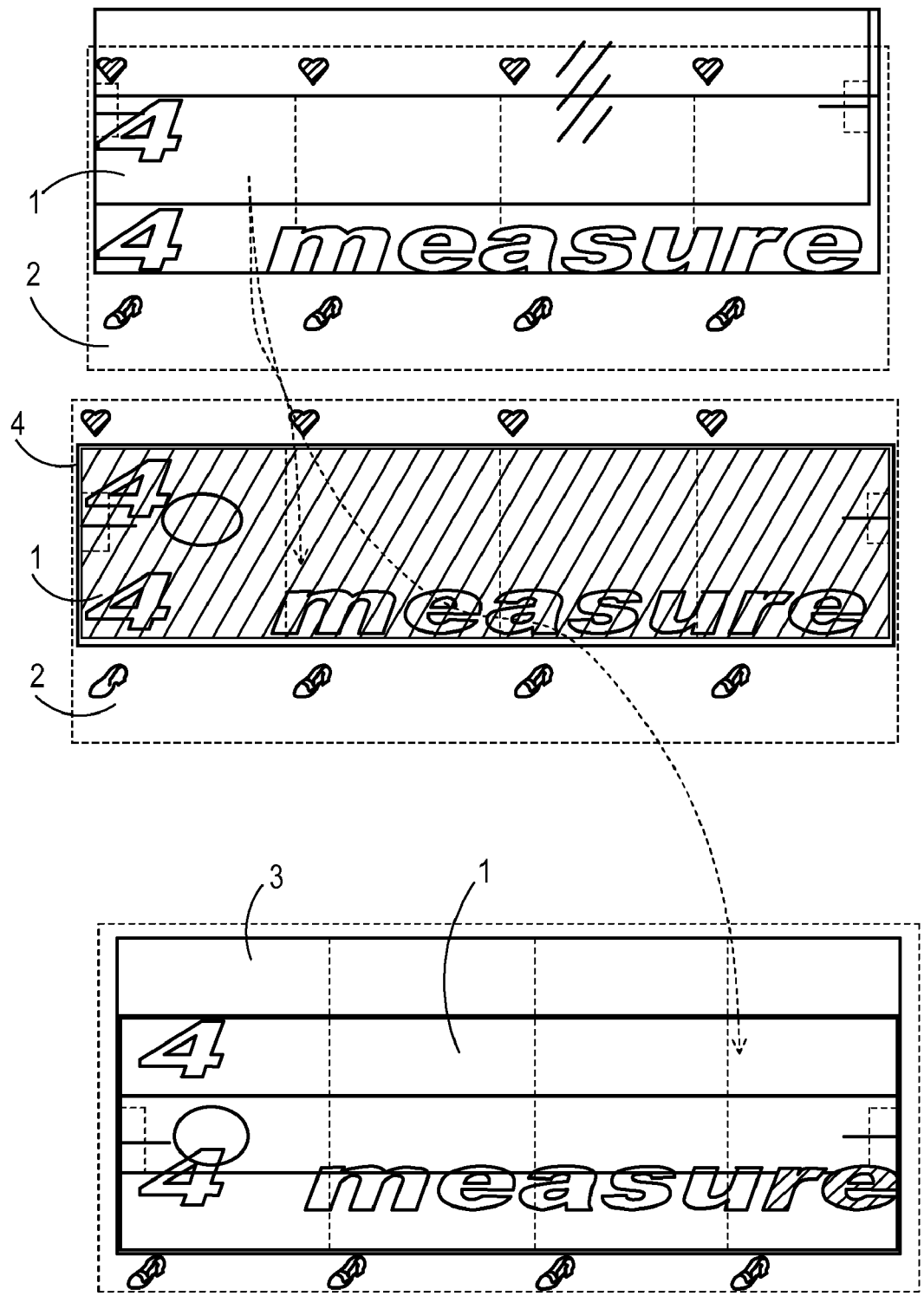
FIG. 2 is a front schematic view of a whole note tile placed upon a 4-4 rhythm measure plaque and a whole tile legend on a 4-4 melodic measure plaque, according to an embodiment of the technology described herein.

Referring now to FIG. 1, a Whole Note Tile 1, 4-4 Rhythmic Measure Plaque 2, and 4-4 Melodic Measure Plaque 3 are shown. A Rhythmic Measure Plaque 2 has no staff lines. A Melodic Measure Plaque 3 has 5 horizontal staff lines. Shown are transparent Whole Note Tile 1, Measure Tile 2 and its reverse side, Measure Tile 3. When Rhythmic Measure Plaque 2 is flipped over to its reverse side, Melodic Measure Plaque 3 is revealed with its 5 staff lines. All Note Tiles in this system (such as Whole Note Tile 1) are comprised of transparent acrylic, vinyl or plastic materials. Thus, when any of the Note Tiles in this system are overlaid upon any Measure Plaque herewithin, the clear Tiles allow all the lines and measure information of the Measure Plaques to transmit through them (as shown in FIGS. 2 and 3). This transparency can be seen in FIG. 2: The uppermost illustration shows the transparent Whole Note Tile 1 sliding down over 4-4 Rhythm Measure Plaque 2. The middle picture illustrates how the transparent Whole Note Tile 1 can be maneuvered so that it overlays Rhythm Measure Plaque 2, in such a way that it appears to be nestled between the flanking Bar Lines 4 of the Measure Plaque. In the bottom diagram of FIG. 2, the same Whole Note Tile is overlaid upon the surface of Melodic Measure Plaque 3 so that the whole note icon appears to be situated inside the second space of the staff. As with the middle illustration, it has also been maneuvered so that it appears to rest between the flanking Bar Lines 4 of Melodic Measure Plaque 3.

The user of this system is thus able to select any Note Tile and place it upon any Melodic Measure Plaque, and may slide it up, down or sidewise upon the Measure Plaque until the note inscribed on the Note Tile overlays specific staff lines or spaces, in much the same way a car window decal can be laid over a window graphic, giving the appearance of one complex picture rather than two simpler pictures. This creates the illusion that the note on the Note Tile is actually drawn upon a line or within a space.

This ability to see through the Note Tiles so that they can be precisely positioned as an overlay on top of the lines and spaces of the Melodic Measure Plaques is an important feature of this system, since music composition requires precision in the rendering of notes on lines and spaces. The proportional lengths of the Note Tiles and the music notes printed on them make it possible for a user to compose music accurately within measures without the sophisticated knowledge and skills heretofore required. Finally, every Measure Plaque is comprised of magnetic whiteboard, as are the back sides of all Note Tiles, as seen in FIG. 19; this magnetic adherence insures that the Note Tiles will be affixed to any Measure Plaque that it lies upon. This enables users to sit on the floor or at a table and place their Note Tiles on the Measure Plaques; later, when they want to show their teacher or their classmates, they are able to lift and transport their measures to vertically mounted magnetic surfaces, such as Platforms 76 in FIG. 22, without their tiles sliding to the ground and ruining their efforts.

Referring now to FIG. 2, a Whole Note Tile placed upon a 4-4 Rhythm Measure Plaque and a whole tile legend on a 4-4 Melodic Measure Plaque are shown. FIG. 2 demonstrates that Whole Note Tile 1 can be placed onto 4-4 Rhythm Measure 2 or 4-4 Melodic Measure Plaque 3 in such a way that it fits precisely within the Bar Lines 4 of said Measure Plaques. As noted in FIG. 1, the Whole Note Tile 1, like all other Note Tiles, is transparent and will thus allow all lines, spaces and other information of Measure Plaque 2 (and all other Measure Plaques) to show through when the user slides it over and rests it upon a Measure Plaque (see also FIG. 3). Since the user can see through the Note Tiles, he or she may slide the Note Tiles up, down or sidewise, so that the he or she is able to precisely place the inked notes and rests on or between specific staff lines. Both Whole Note Tile 1 and all other Note Tiles also have magnetic properties as seen in FIG. 19 which serve to magnetically adhere one to the other to insure continuity of placement, particularly if the Note Tiles and Measure Plaques are to be transported.

Referring now to FIG. 3, a Whole Note Tile in a Staff Space and a Whole Note Tile on a Staff Line are shown. These two illustrations show how the Whole Note Tile 1, can be placed either within a staff space (sandwiched between two staff lines) or on a staff line. The Dotted-Line Brackets 5, inscribed on the left and right flanking sides of said Whole Note Tile 1, (and all other standard notation Tiles) help to assist the user in aligning space notes precisely between two adjacent staff lines. When the top and bottom dotted lines of a Dotted-line Bracket are placed on top of 2 adjacent staff lines, the resulting note will be properly positioned as a space note. Similarly, when Solid Flanking Strips 6 (sandwiched between Dotted-Line Flanking Brackets 5) aligns precisely upon a staff line, the resulting note placement will be accurately depicted as a line note. These features help students to place notes on the staves with the precision required in music composition, a feat that frequently confuses and frustrates young students when they attempt to draw notes manually.

Referring now to FIG. 4, a side view of a Quarter Note Tile 8 is shown. This view shows that Note Tiles, Dotted-line Brackets, and Solid Locating Strips are deeply etched and inked into the tiles' transparent plastic material in order to facilitate both visual and tactile comprehension for seeing and seeing-impaired students. Further, all lines, numbers, words and symbols of this entire system are also deeply etched into their plastic or metallic surfaces for the same purposes. Alternatively, raised, rather than indented or etched, elements can be used. Also alternatively, the elements can be delineated by ink alone. Beat Delineation Lines 30 are shown. The spaces between said Dotted Lines 30 delineate a Beat Unit 30a, the area that lies between 2 adjacent dotted lines 30 or between a dotted line and an adjacent bar line.

Figure 5:
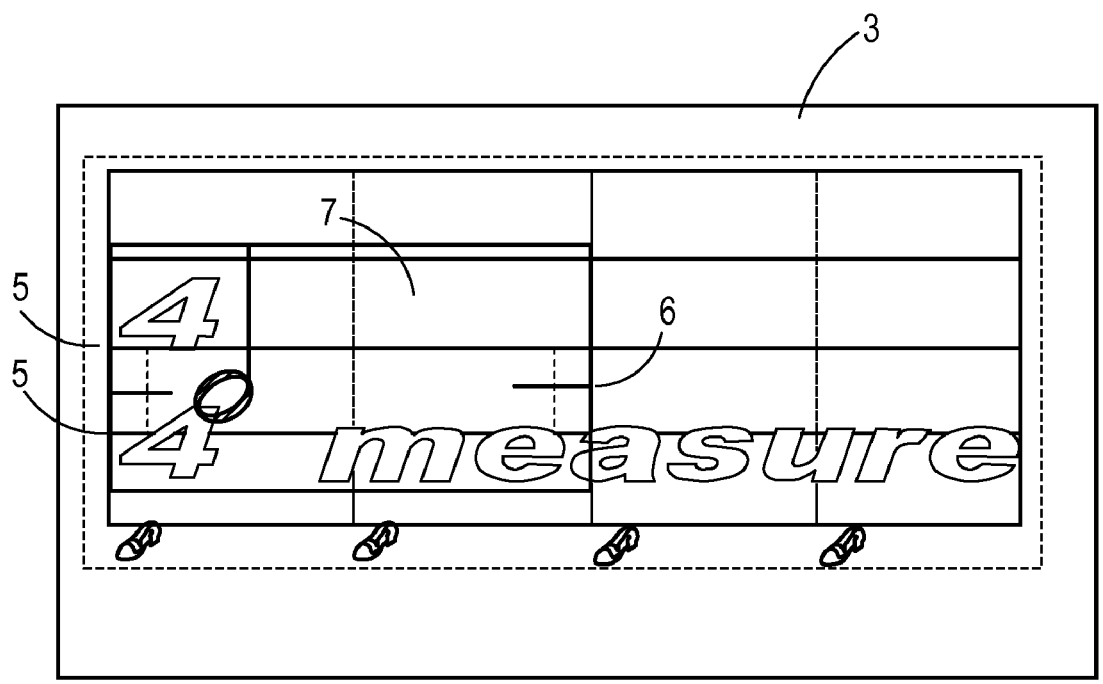
FIG. 5 is a front schematic view of a half note shown on top of a 4-4 measure plaque, according to an embodiment of the technology described herein.

Referring now to FIG. 5, half note tile 7 is shown on top of a 4-4 Measure Plaque 3. Half Note Tile 7, which is half the length and subsequently half the duration value of a whole note, is shown fitting into one half of a 4-4 measure. Half Note Tile 7 is also depicted as a space note, wherein the Note Tile's Dotted Locating Bracket is situated directly on top of two staff lines of the said Measure Tile.

Figure 6:
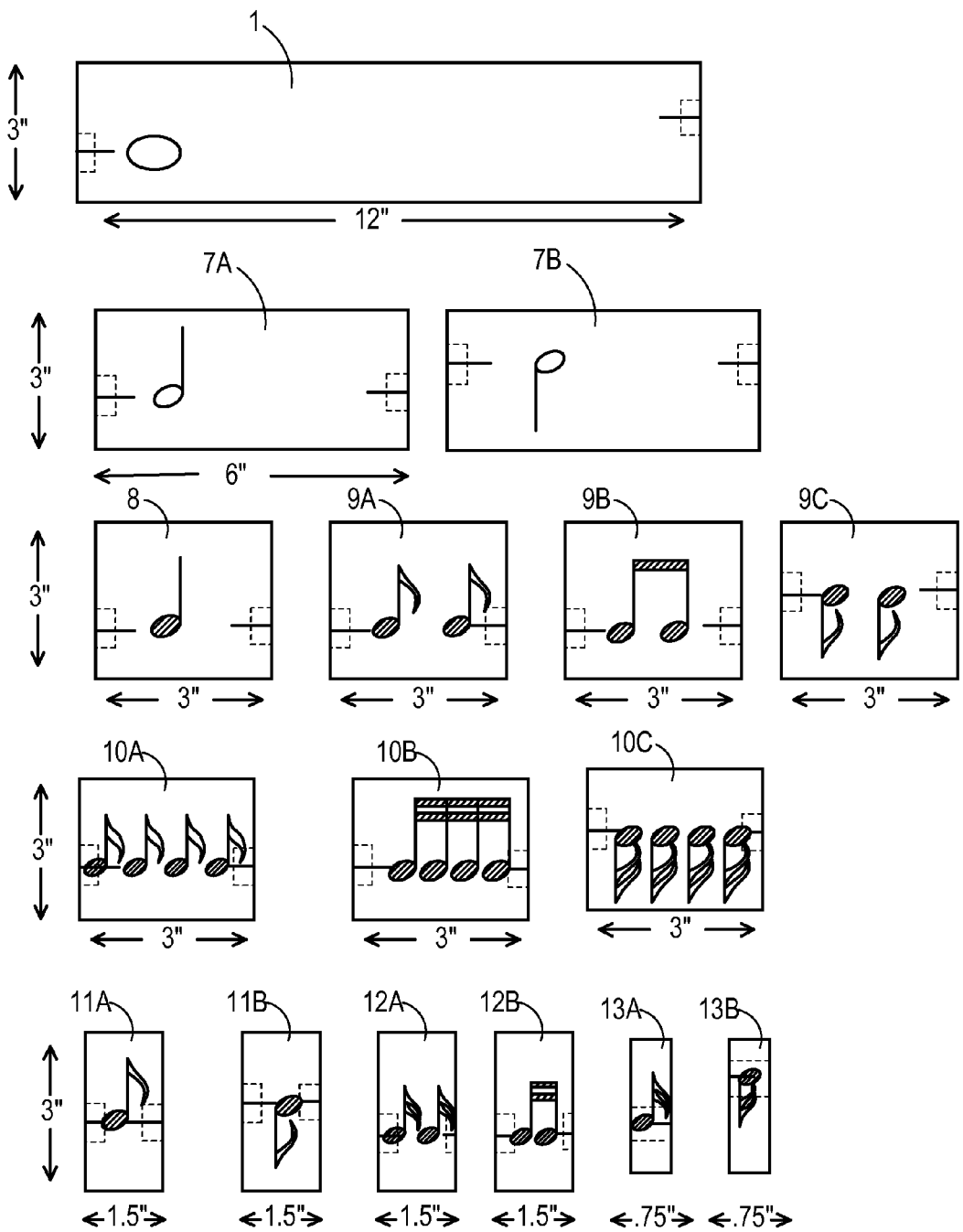
FIG. 6 is a front schematic view of common musical notes inscribed on note tiles, according to an embodiment of the technology described herein.

Referring now to FIG. 6, common musical notes inscribed on note tiles are shown. 1 is a Whole Note Tile. 7a is a Half Note Tile Stem Up Tile. 7b is a Half Note Tile Stem Down Tile. 8 is a Quarter Note Tile which can be used as a stem up or stem down note. 9a is two Eighth Notes Stems Up Tile. 9b is two Eighth Notes Beamed Stems Up Tile. 9c is two Eighth Notes Stems Down Tile. 10a is four Sixteenth Notes Stems Up Tile. 10b is four Sixteenth Notes Beamed Stems Up Tile. 10c is four Sixteenth Notes Stems Down Tile. 11a is an Eighth Note Stem Up Tile. 11b is an Eighth Note Stem Down Tile. 12a is two Sixteenth Notes Stems Up Tile. 12b is two Sixteenth Notes Beamed Stems Up Tile. 13a is a Sixteenth Note Stem Up Tile. 13b is a Sixteenth Note Stem Down Tile.

Each of the notes shown in FIG. 6 is inscribed onto a tile that reveals its duration relative to the length of duration of a whole note. For example, a half note in music is half the duration of a whole note; similarly in this system, Half Note Tile 7a and 7b at 152 mm (6") is half the length of a Whole Note Tile 1 at 304 mm (12"). A quarter note value is ¼ of the duration of a whole note and likewise, Quarter Note Tile 8 at 76.2 mm (3") is ¼ the length of said Whole Note Tile. Also revealed are common means of depicting eighth, and sixteenth notes. As seen in FIG. 6, eighth and sixteenth notes are inscribed as individual notes or as beamed notes, with stems either up or down.

Figure 7:
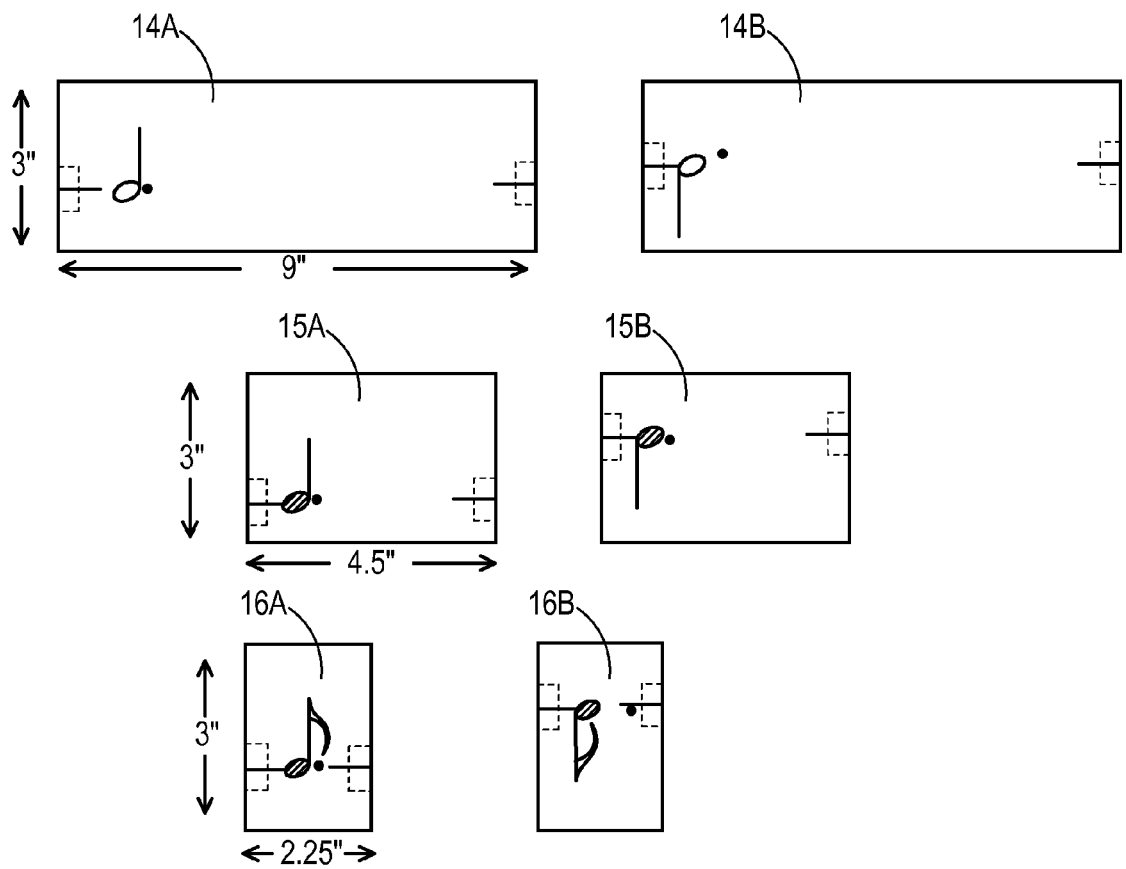
FIG. 7 is a front schematic view of a dotted half, quarter, and eighth note tiles, according to an embodiment of the technology described herein.

Referring now to FIG. 7, dotted half, quarter, and eighth note tiles are depicted. 14a is a Dotted Half Note Stem Up Tile. 14a is a Dotted Half Note Stem Down Tile. 15a is a Dotted Quarter Note Stem Up Tile. 15b is a Dotted Quarter Note Stem Down Tile. 16a is Dotted Eighth Note Stem Up Tile. 16b is a Dotted Eighth Note Stem Down Tile.

Note Tiles 14a-16b show the relative length of dotted notes. A dotted note will receive 1.5 times the duration of the note without a dot. Likewise, these Note Tiles are 1.5 times the length of the originating Note Tiles. For example, the Dotted Half Note Tiles 14a and 14b (228.6 mm (9")) are 1.5 times the length of Half Note Tiles 7a and b (152.4 mm (6")); the Dotted Quarter Note Tiles 15a and 15b, (114.3 mm (4.5")) are 1.5 times the length of the Quarter Note Tile 8 (76.2 mm (3")); and the Dotted Eighth Note Tiles 16a and 16b (57.15 mm (2.25"), are 1.5 times the length of the Eighth Note Tiles 11a and 11b (38.1 mm (1.5")). Young students usually have a very difficult time calculating the relative values of dotted notes. These tiles make these abstract mathematical relationships much more understandable to children because they are manipulatives, and children often learn best with such kinesthetic teaching models.

Figure 8:
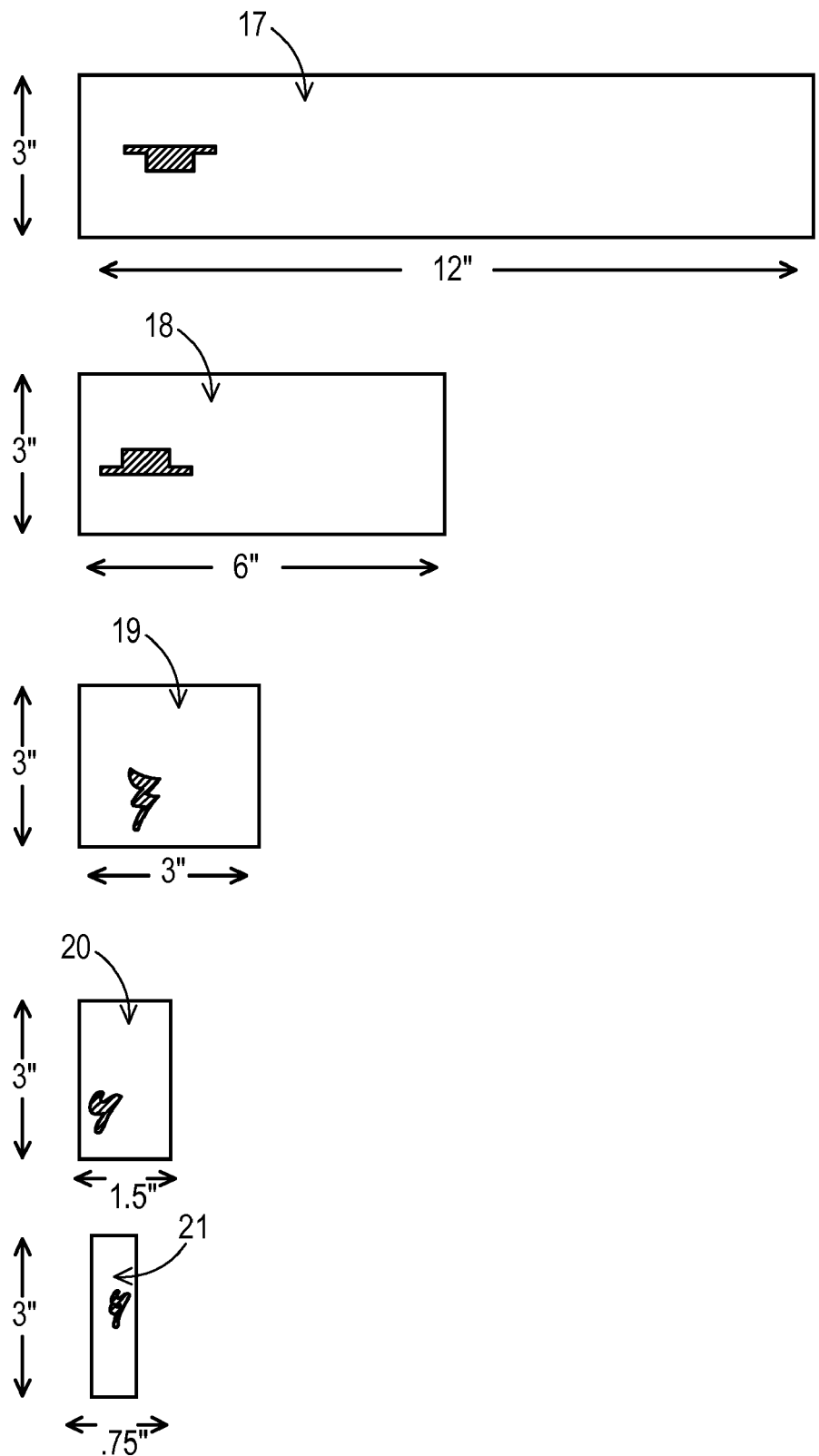
FIG. 8 is a front schematic view of a rest tiles, according to an embodiment of the technology described herein.

Referring now to FIG. 8, rest tiles are shown. 17 is a Whole Rest Tile. 18 is a Half Rest Tile. 19 is a Quarter Rest Tile. 20 is a Eighth Rest Tile. 21 is a Sixteenth Rest Tile.

These Rest Tiles 17-21 have the same heights and lengths as their correlative Note Tiles in FIG. 6. Test icons, however, denote durations of silence rather than sound. Unlike whole and half rests, the quarter, eighth and sixteenth rests do not require exact placement upon the staff; as a result, the latter three types of Rest Tiles do not come with Dotted Locating Brackets and Solid Locating Strips.

Figure 9:
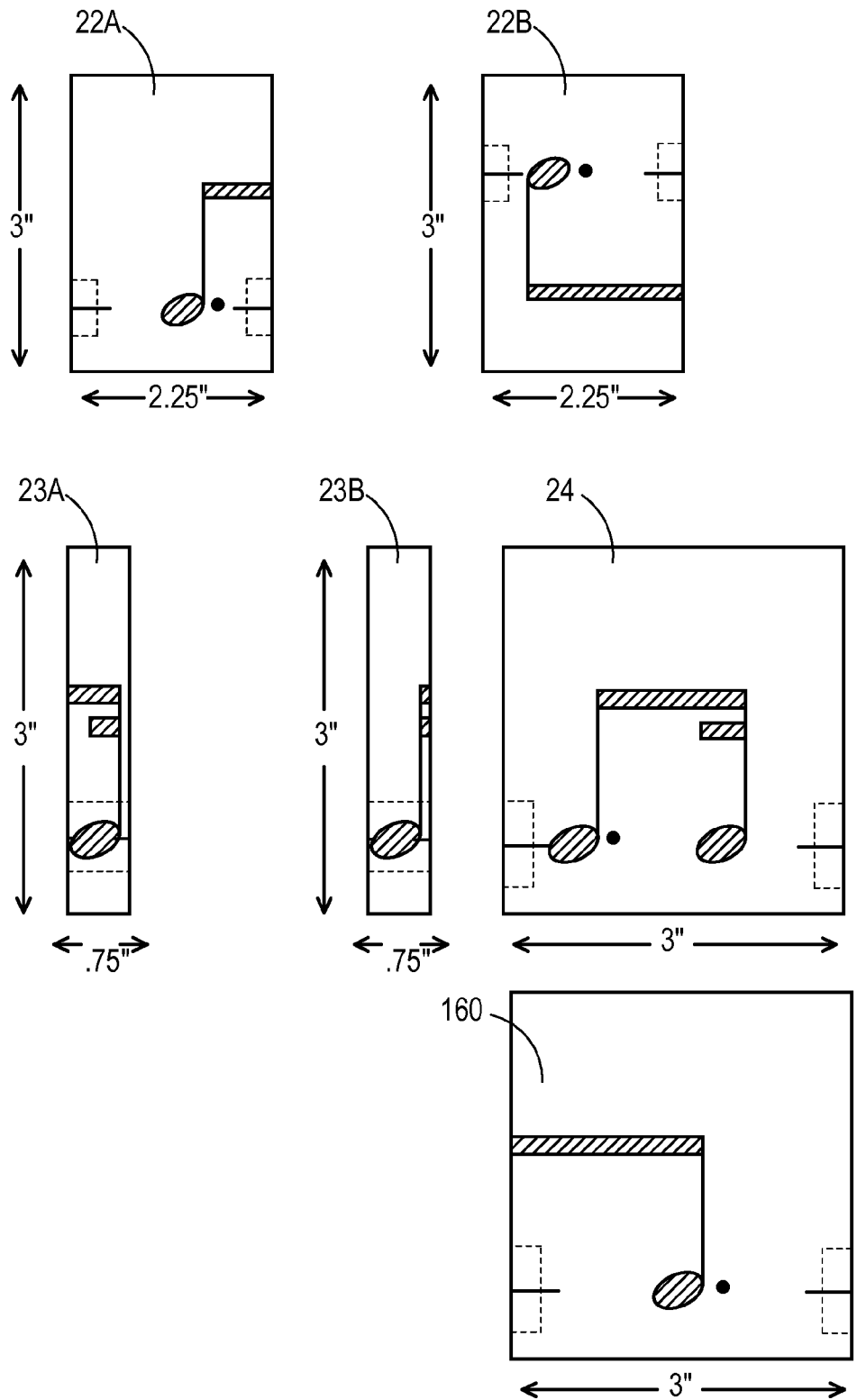
FIG. 9 is a front schematic view of dotted eighth and sixteenth note beamed tiles, according to an embodiment of the technology described herein.

Referring now to FIG. 9, dotted eighth and sixteenth note beamed tiles are shown. 22a is a Dotted Eighth Note Stem Up Tile. 22b is a Dotted Eighth Note Stem Down Tile. 23a is a Sixteenth Right Side Beamed Note Stem Up Tile. 23b is a Sixteenth Left Side Beamed Note Stem Up Tile. 24 is a Dotted Eighth and Sixteenth Beamed Note Stems Up Tile. 160 is a dotted eight note, right side of beam.

Tiles 22a through 23b are modular beamed tiles that are highly effective manipulatives for teaching beamed eighth and sixteenth notes and their durations. The heights and lengths of each are exactly the same as the unbeamed versions in FIG. 6. The notes Tile 24 have also been printed together onto one tile, not only because the two notes are a common pairing in music, but because doing so is useful when comparing it next to modular Tiles 22a and 23a.

Figure 10:
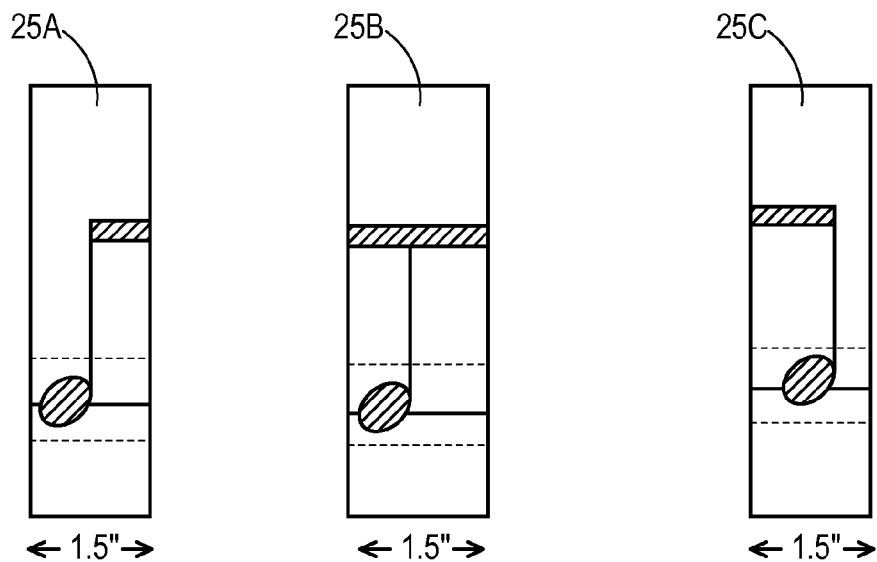
FIG. 10 is a front schematic view of beamed eighth note tiles, according to an embodiment of the technology described herein.

Referring now to FIG. 10, beamed eighth notes tiles are shown. 25a is a Left Side Beamed Eighth Note Tile. 25b is an Eighth note as Mid Part of Beam Tile. 25 is a Right Side Beamed Eighth Note Tile. These Beamed Eighth Note Tiles are interchangeable and relative in length to their durations in time.

Figure 10A:
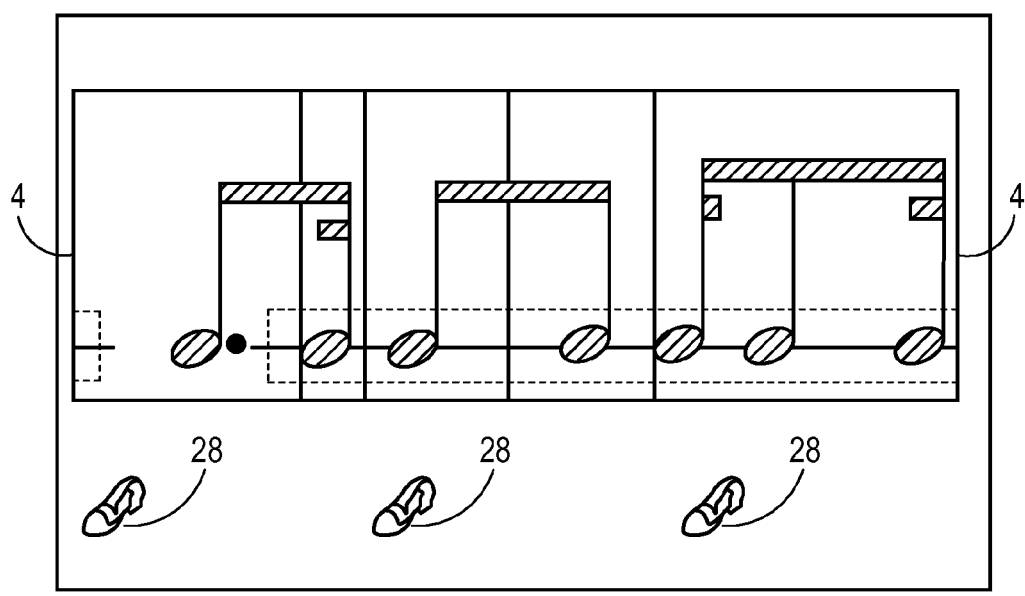
FIG. 10A is a front schematic view of illustrating modular notes tiles on a measure plaque, according to an embodiment of the technology described herein.

Referring now to FIG. 10a, modular note tiles fitted on a measure plaque are shown. Depicted are Modular Note Tiles from FIGS. 9 and 10 as they might be seen on Measure Plaque FIG. 11.

Referring now to FIG. 11, a three-four rhythm measure plaque is depicted. 4 is Bar Line (two solid Bar Lines flank every measure). 26 is a Time signature. 27 are Heart Icons denoting the beginning of every beat. 28 are Shoe Icons denoting the beginning of every beat. 29 is the inscribed word "measure." 30 is a Beat Delineation Line. 30a is a Beat Unit.

This measure is only for composing rhythmic compositions without tonal variations since it has no staves to indicate tonal changes. Every Beat Unit is 3" wide and framed either by 2 adjacent dotted lines, or a Bar Line and an adjacent dotted line. The height of the flanking Bar Lines 4 is also 3". The resulting 3"×3" size of each Beat Unit corresponds to the length and height of Quarter Note Tile 8 and Quarter Rest Tile 19, and all combinations of notes that equal one beat length (i.e., 3" length). Heart Icons 27 and Shoe Icons 28 further elucidate the sensory feel of beats to complement the visual aspect of said Beat Units. Time Signature 26 of Three over Four dictates the following rules about all Three over Four measures: The Top number (3) indicates the number of beats in each measure. The Bottom number (in this case, 4) informs a musician of the type of beat that will receive one beat in each measure. Many musicians find it easy to visualize this concept if they imagine that this bottom number is a denominator in a fraction of which 1 is always the numerator: A 4 on the bottom always indicates that a Quarter note will receive one beat. When a 2 is at the bottom, a Half note will receive one beat. If an 8 is on the bottom, an Eighth note will receive one beat.

Summarily students and teachers can quickly place combinations of notes into the Beat Units and can easily perceive if combinations of notes fit or don't fit into Beat Units. All lines, words, and icons on this Measure Plaque, and all other Measure Plaques, are deeply engraved to assist the understanding of music theory in kinesthetic and seeing-impaired students.

Figure 12:
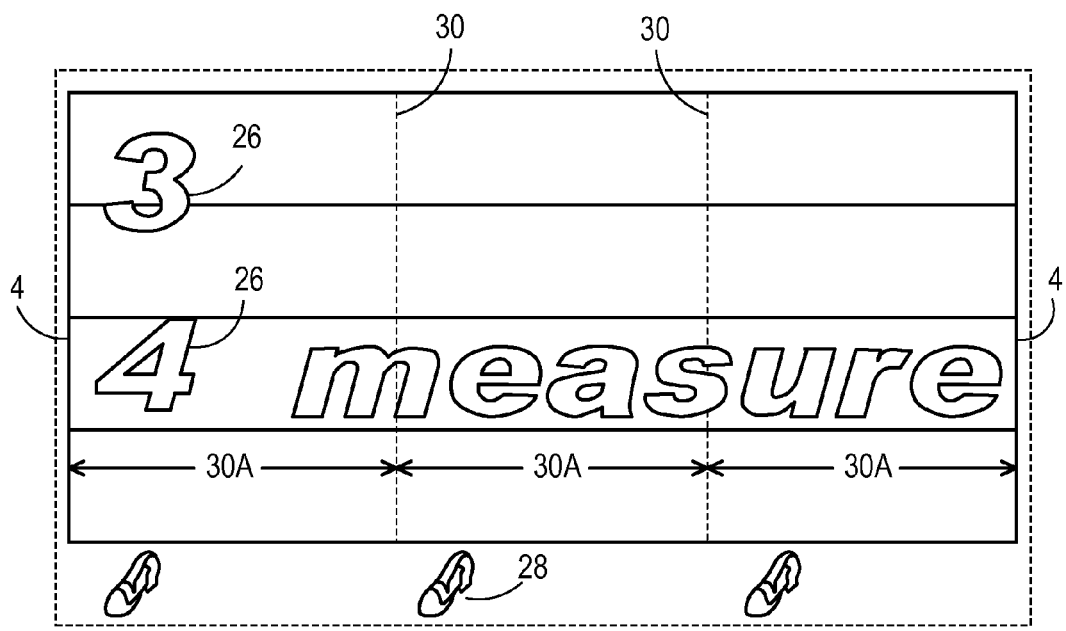
FIG. 12 is a front schematic view of a three-four melodic measure plaque, according to an embodiment of the technology described herein.

Referring now to FIG. 12, a three-four melodic measure plaque is depicted. 4 are Bar Lines. 26 is a Time Signature. 28 are Shoe icons denoting a beat. 29 is the word "measure." 30 is a Beat Delineation Line. 30a is a Beat Unit.

Shown is the equivalent of FIG. 11 with the addition of staff lines or staves but without hearts. This feature enables the user to place transparent Note or Rest Tiles on any of the staff lines or spaces within the Bar Lines 4 of Measure Plaque. All lines, words, and icons on this Measure Plaque, as with all other Measure Plaques, are deeply engraved to assist the comprehension of music theory by kinesthetic and seeing-impaired users.

Referring now to FIG. 13, a two-four rhythm measure plaque is shown. 4 are Bar Lines. 26 is a Time Signature. 28 are Shoe icons denoting a beat. 29 is the word "measure." 30 is a Beat Delineation Line. 30a is a Beat Unit.

Shown is the equivalent of FIG. 11 (see description above) except that the Two-Four Rhythm Measure Plaque has a length between Bar Lines 4 of 152 mm (6") which is exactly the same length of a 2-beat Half Note Tile 7a or 7b, two Quarter Note Tiles 8, or any combination of Note Tiles to equal 152 mm (6"). Time Signature 26 of two over four dictates the following rules about all two over four measures: The Top number (2) indicates the number of beats in each measure. The Bottom number (in this case, 4) informs the user of the type of beat that will receive one beat in each measure.

Figure 14:
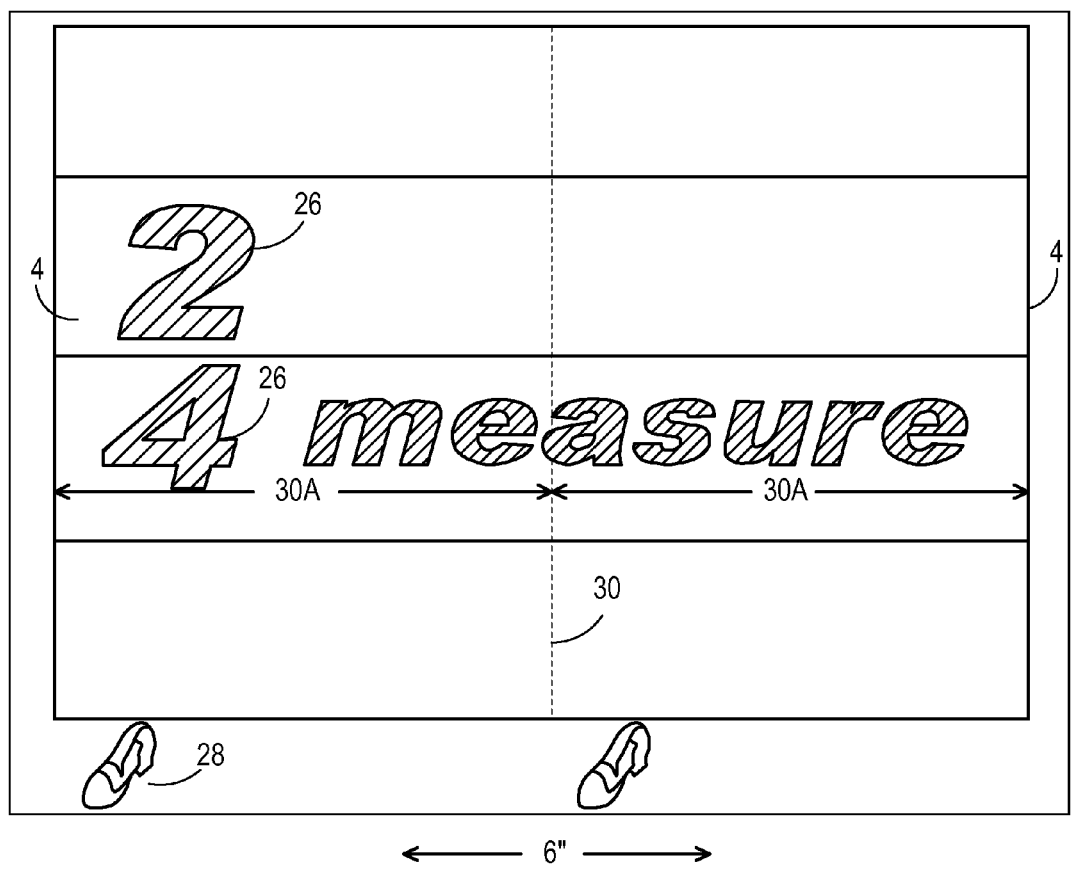
FIG. 14 is a front schematic view of a two-four melodic measure plaque, according to an embodiment of the technology described herein.

Referring now to FIG. 14, a two-four melodic measure plaque is shown. 26 is a Time Signature. 28 are Shoe icons denoting a beat. 30 is a Beat Delineation Line. 30a is a Beat Unit.

Shown is the equivalent of FIG. 13 with the addition of staff lines or staves and without hearts. Time Signature 26 of two over four dictates the following rules about all two-four measures: The top number (2) indicates the number of beats in each measure. The bottom number (4) informs the user of the type of beat that will receive one beat in each measure. Users can quickly place combinations of notes into said Beat Units 30*a* and can easily perceive if combinations of notes fit into Beat Units and/or the measure. All lines, words, and icons on this Measure Plaque, as with all other Measure Plaques, are deeply engraved to assist the comprehension of music theory by kinesthetic and seeing-impaired students.

Referring now to FIG. 15, a six-eight rhythm measure plaque is shown. 26 is a Time Signature. 30 is a Beat Delineation Line. 30*a* is a Beat Unit.

Shown is a Rhythm Measure Plaque similar to FIGS. 11 and 13 but which has a time signature of 6 over 8. The latter dictates that there should be exactly 6 beats in every measure (as indicated by the top number, 6), with an eighth note receiving one beat (as indicated by the bottom number, 8). Each Beat Unit is 38.1 mm (1.5") in length, half the size of a Quarter Note Tile 8. The measure reveals 6 Beat Units within it, each the size of an eighth note, an eighth rest or any combination of notes and rests that will add up to 38.1 mm (1.5") in combined lengths.

Figure 16:
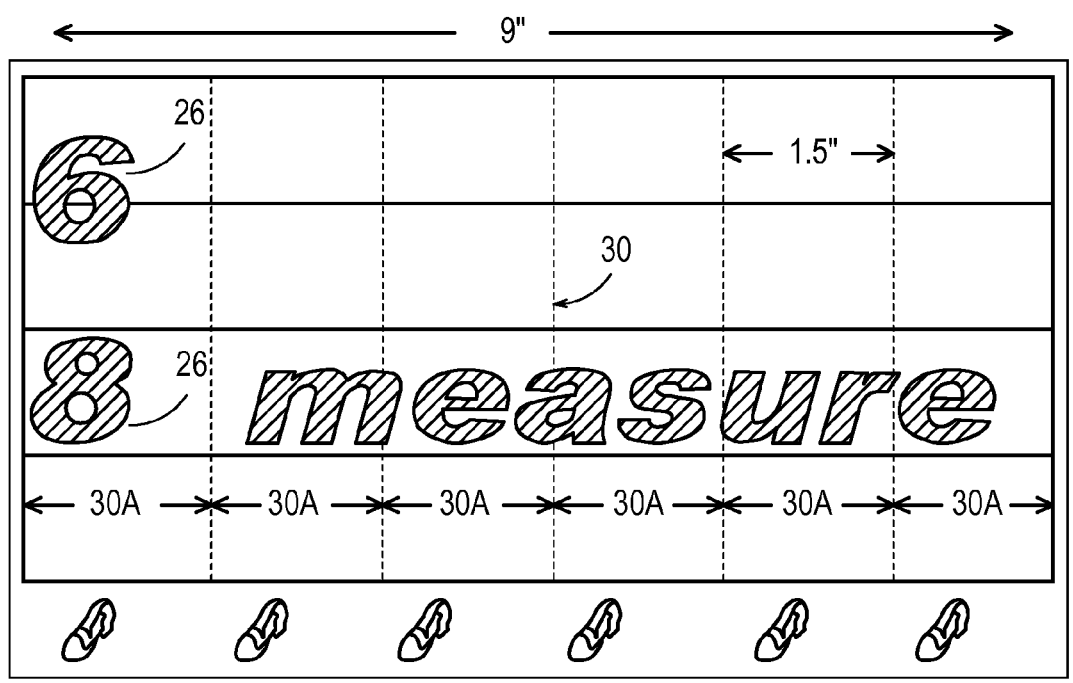
FIG. 16 is a front schematic view of a six-eight melodic measure plaque, according to an embodiment of the technology described herein.

Referring now to FIG. 16, a six-eight melodic measure plaque is shown. As in said Measure Plaques FIGS. 12 and 14, FIG. 16 is the melodic counterpart to its flip side, the Six-Eight Rhythm Measure Plaque. Each Beat Unit is 1.5" wide, half the size of a Quarter Note Tile 8 and has 6 such units in this Measure Plaque. As in FIG. 15, the Time Signature dictates that an eighth note will receive one beat (indicated by an 8 on the bottom of the Time Signature) and that the entire Measure will have 6 units of beats.

Figure 17:
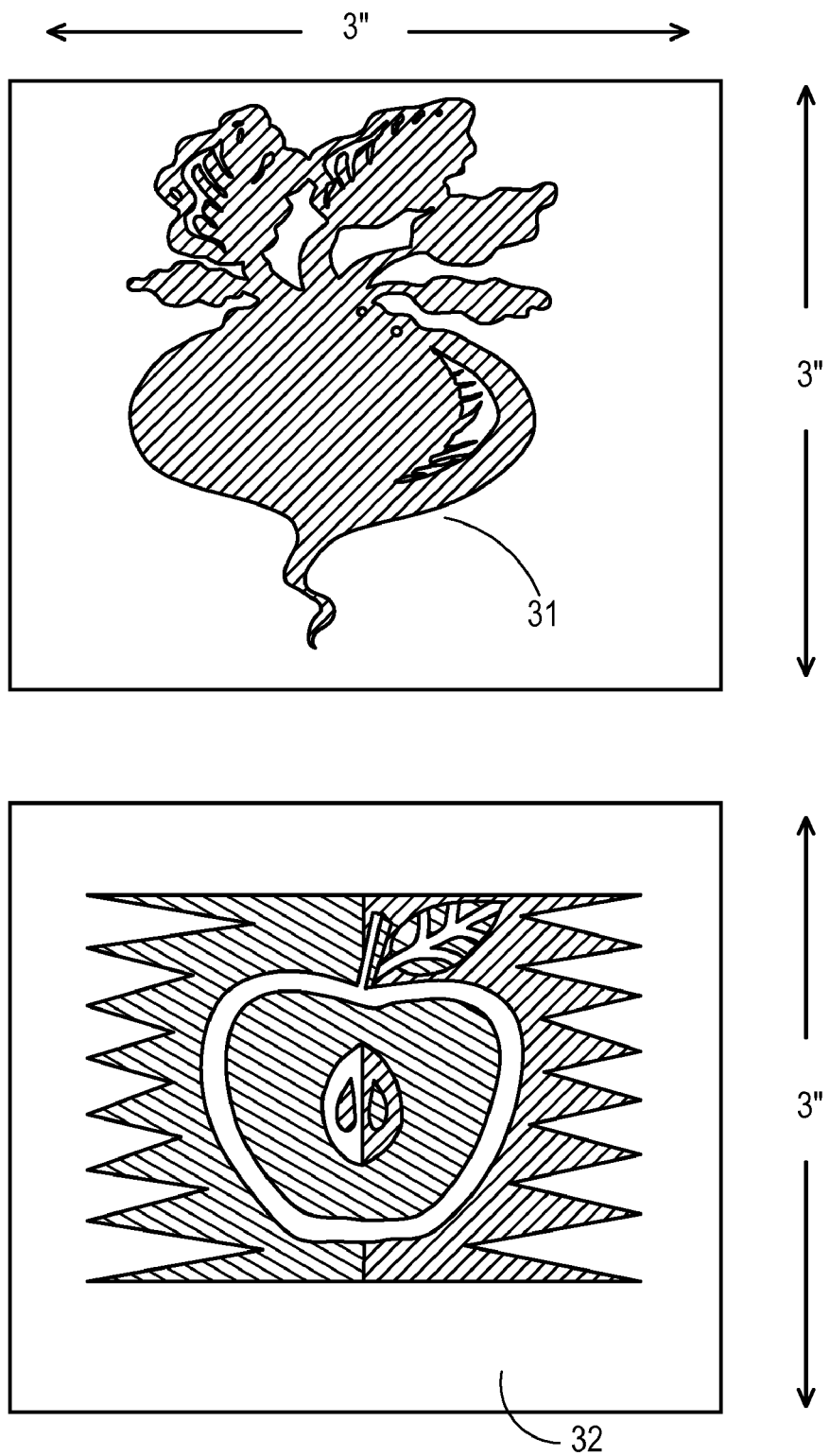
FIG. 17 is a front schematic view of pre-reading rhythmic tiles, according to an embodiment of the technology described herein.

Referring now to FIG. 17, rhythmic tiles are depicted. 31 is a Beet Icon Note Tile. 32 is an Apple Icon Note Tile. These Icon Note Tiles serve to help pre-readers or emerging readers make an easy transition to composing with traditional music notes. The beet icon of Beet Icon Note Tile 31 is a mnemonic symbol of the quarter note (beet=beat). Apple Icon Note Tile 32 is a two-syllable icon standing for the sounds and durations of two eighth notes, similar to Eighth Note Tiles 9*a*, 9*b* and 9*c*. The beet and apple icons are easy for young children to identify and also to create patterns with. These said Beet and Apple Note Tiles are both the size of a Quarter Note Tile 8. Finally, these iconic picture tiles directly segue with children's experiences in Kindergarten and First Grades, which require students to find and create patterns using simple shapes and figures.

Figure 18:
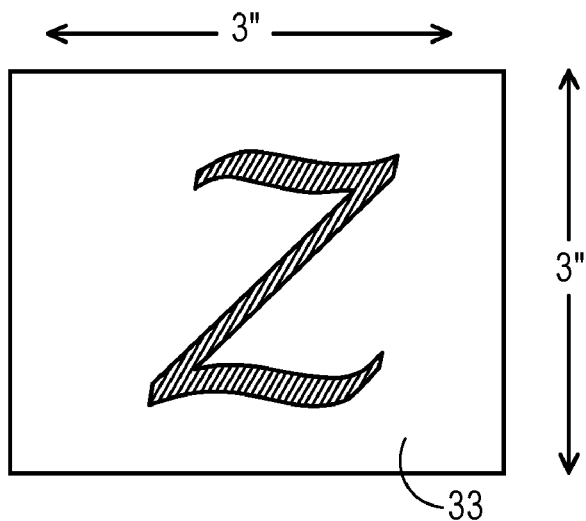
FIG. 18 is a front schematic view of pre-reading rhythmic tiles, according to an embodiment of the technology described herein.
Figure 18:
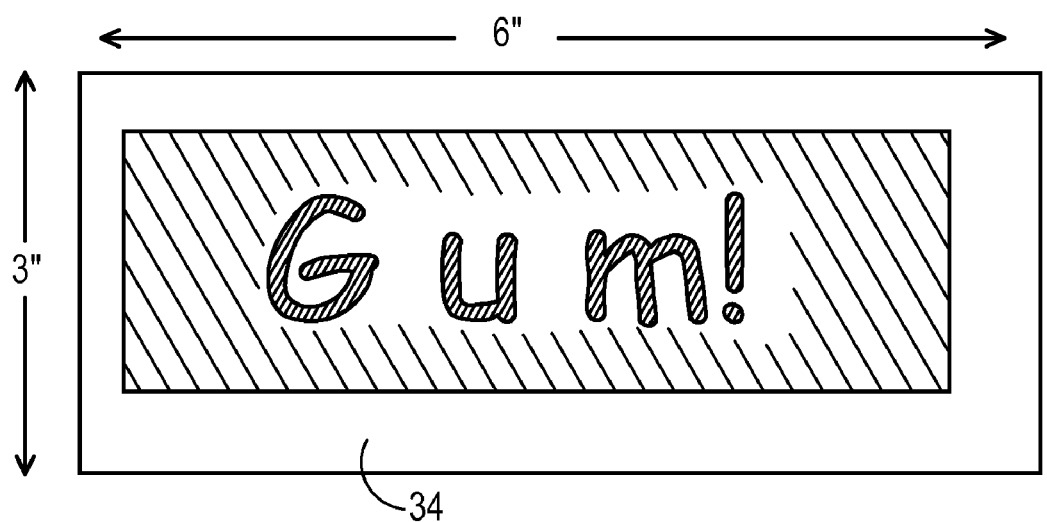

Referring now to FIG. 18, more pre-reading rhythmic tiles are shown. 33 is a Quarter Rest Icon. 34 is a Gum Icon signifying a Half Note sound, (spoken: gu-um!). Shown is Quarter Rest Icon 33 which is a simplified rendition of the quarter rest note found on Quarter Rest Tile 19. Multiple methods, including the Kodaly and Orff music teaching methods, use this version of a quarter rest instead of the traditional rest icon because it is easier for children to replicate when they begin to compose. Gum Icon Tile 34 is also a syllabication of Half Note Tile 7. The Gum Icon 34, like the Half Note Tile 7, is twice the length of Quarter Note Tile 8. It is verbalized in an elongated fashion: "Guu-uum" wherein the user may associate it with an elongated or stretched quarter note and to the stretch of real chewing gum.

Referring now to FIG. 19, illustrates the side magnetic areas on a note tile. 8 is a Quarter Note Tile. 36 is a Magnetic Area (on back side only). The back sides of all Note Tiles have strong Magnetic Areas 36 inscribed directly behind the inked areas of all Note and Rest Tiles. These magnetized areas will allow Note and Rest Tiles to magnetically affix to any Measure Plaque, which are comprised of magnetic white board materials. This magnetic adhesion between Note and Rest Tiles upon the aforesaid Measure Plaques helps to insure the former's secure placement on horizontal or vertical surfaces for hours or days at a time. In an alternative embodiment the magnet is placed with a bored hole on the back side of the note tile such that magnet once inserted into the hole is flush with the back surface of the note tile. The magnet can be glued into the hole to secure the magnet. Furthermore, transparent texture strips 150 can be added to the back side of the note tile. These strips prevent the tile from rotating. The note tile, magnet, and texture strips can be integrally formed such as a thermoplastic molding, or like transparent compound.

Figure 20:
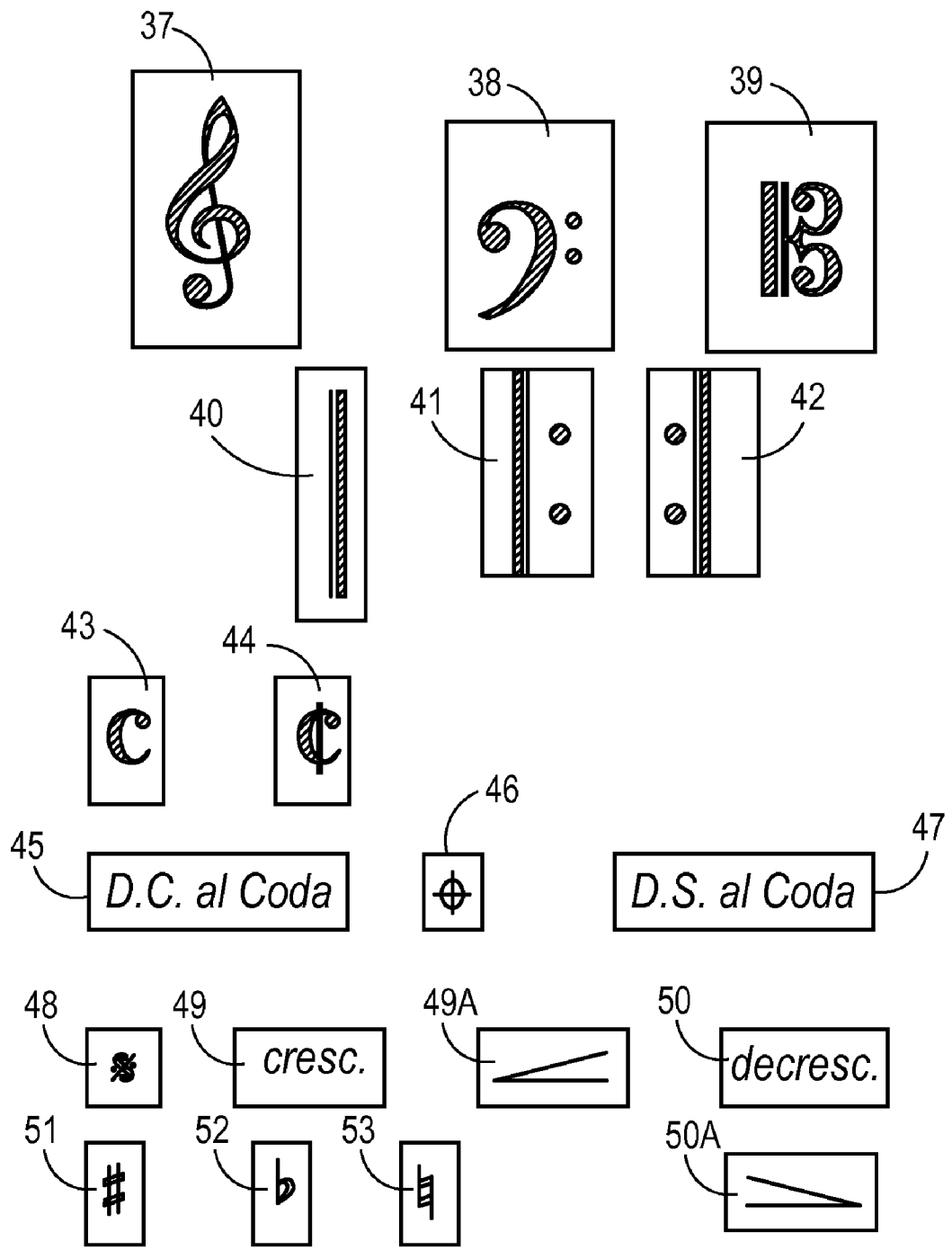
FIG. 20 is a front schematic view of a symbol labels, according to an embodiment of the technology described herein.

Referring now to FIG. 20, symbol labels are depicted. 37 is a Treble Clef. 38 is a Bass Clef. 39 is an Alto Clef. 40 is a Double Bar Line which means the end of the piece of music. 41 is a Repeat Sign (repeat section to the right). 42 is a Repeat Sign (repeat section to the left). 43 is Common Time (same as 4-4 Time Signature, as seen on numbers 2 and 3). 44 is Cut Time (same as 2-2 Time Signature) wherein the Half Note 7 receives only one beat (as designated by the lower number 2) and the entire measure can only receive 2 beats (signified by the upper number 2). 45 is D.C. al Coda (dal capo al coda in Italian) which means the musician must go to the beginning of the piece and continue playing until he/she comes to the Coda Sign 46, then he/she must skip to the end of the piece where a Coda Icon 47 can be found. The player then plays from Icon to the end of the piece. 46 is a Coda Icon. 47: D.S. al Coda (dal segno al coda in Italian). The player is instructed, with this marking, to go toward the beginning of the piece (but not the very beginning) and find the Segno icon 48 and repeat the piece from that point. 48 is a Segno marking or icon. 49 is a Crescendo. Increase dynamics or volume. 49*a* is an Icon for Crescendo. 50 is Decrescendo in Italian. (Gradually decrease the dynamics.) 50*a*. Icon for Decrescendo. 51 is a Sharp. (Raises the pitch half a step.) 52 is a Flat. (Lowers the pitch half a step.) 53 is a Natural. (Ignores the previous flat or sharp for that note.)

These Symbol Labels, made from vinyl-like or other materials that cling on contact, can either be placed on the front faces of said Note and Rest Tiles, Measure Plaques or Platforms FIG. 22. These Symbol Labels offers a plurality of options and nuances to more sophisticated users, and adds hands-on learning opportunities to students who need tactile correlatives of these symbols.

Figure 21:
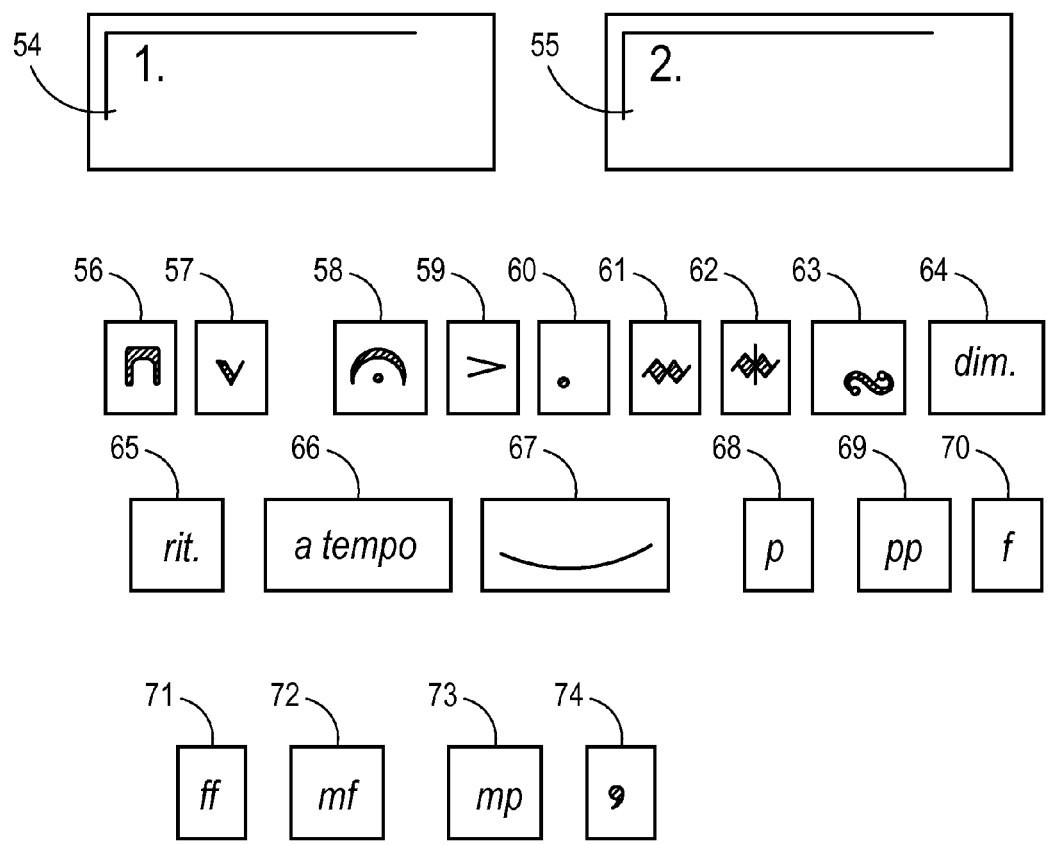
FIG. 21 is a front schematic view of a symbol labels, according to an embodiment of the technology described herein.

Referring now to FIG. 21, various symbol labels are illustrated. 54 is a First Ending. During the first verse of a piece, play the music within this bracket but do not play the second, third or fourth endings. 55 is a Second Ending. During the second verse of a piece, skip the First Ending 54 and hop directly to the music written within this bracket. 56 is a Down Bow marking for orchestras. 57 is an Up Bow marking for orchestra. 58 is a Tenuto in Italian. Hold the note longer than its value. 59 is an Accent mark. Play the note under it (or over it) more powerfully than the rest. 60 is a Staccato. When it is found over or under a note, play the note very dryly, without sustaining the note for the full value. 61 is a Trill, a rapid alternation between an indicated note and the one above. 62: is a Mordent, a melodic embellishment consisting of a rapid alternation of a principal tone with the tone a half or a whole step below it. 63 is a Turn, a short figure consisting of the note above the one indicated, the note itself, the note below the one indicated, and the note itself again. 64 is a Diminuendo, to soften. 65 is a Ritardando, to gradually slow down. 66 is an A tempo in Italian, to take the piece at original tempo. 67 is a tie and combines the values of two adjacent notes when they are under or over the tie if they are on the same note. Tie 67 can be one of an assortment of sizes to reach the varying lengths between notes. 68 is Piano, to play or sing softly. 69 is Pianissimo, to play or sing very quietly. 70 is Forte, to play or sing loudly. 71 is Fortissimo, to play or sing very loudly. 72 is Mezzo Forte in Italian, to play or sing medium loudly. 73 is Mezzo Piano, to play or sing medium softly. 74 is a breath mark, to breathe quickly here.

These Symbol Labels, made from vinyl-like materials that cling on contact, can either be placed on the face of Note Tiles and Measure Plaques, or adjacent to them. Said Symbol Labels offers a plurality of options and nuances to users, and adds hands-on learning opportunities to students who need tactile correlatives for the optimum absorption of education.

Referring now to FIG. 22, a platform and bridging device is shown. Shown figures reveal Platforms 76 (made of magnetic white board materials) and Bridging Device 78 (made of acrylic-like material and Magnetic Strips 75). Bridging Device 78 dovetails with Platforms 76 to allow a plurality of Platforms to be connected and transported together, indicated by broken line in FIG. 22. When joined and dovetailed properly, Platform 76 and Bridge Device 78 will result in a smooth and level surface. Lip 77 is configured to support Measure Plaques, and Notes Tiles, keeping them aligned. In at least one embodiment, lip 77 is not raised to literally hold note tiles in place, but is simply a painted line of the surface to provide for alignment. Recessed areas 79 of the Bridge Device 78 dovetail to the flanking back views 80 of Platform. These devices allow the user to place Note and Rest Tiles, Measure Plaques and Symbols upon long, supportive magnetic surfaces that can be bridged to each other. For example one or more students might assemble a composition using said Tiles and Plaques, and Platforms 76 on a classroom table or floor. The said devices could be linked securely together by Bridging Devices 78 and subsequently transported as a unit to wall surfaces in order to be displayed to an audience. Said Platforms 76 could be mounted onto wall nails or hooks by virtue of the Mounting Keyholes 75a, or onto a large classroom white board by virtue of the Magnetic Strips 75—both on the back sides of Platforms 76.

Figure 23:
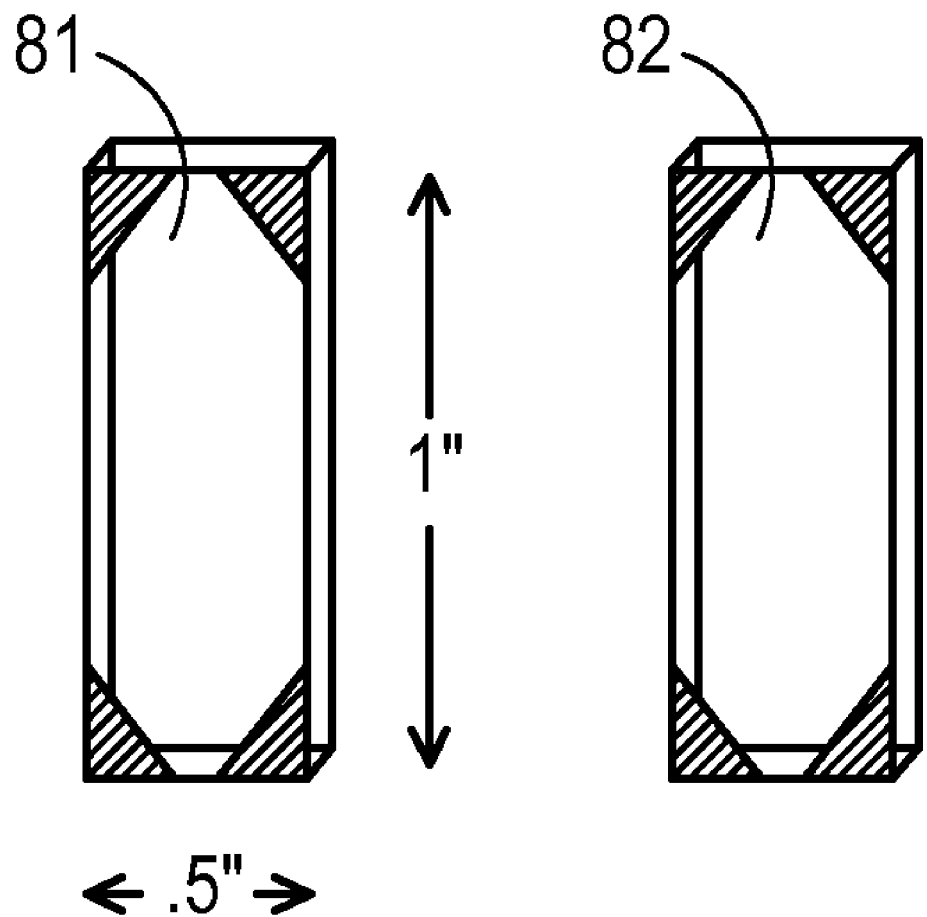
FIG. 23 is a front schematic view of a note tile spacers, according to an embodiment of the technology described herein.

Referring now to FIG. 23, note tile spacers are shown. The front 81 of the tile spacer is shown. The back 82 of the tile spacer is shown. When said Note Tiles are stacked onto Measure Plaques as chords as will be seen in FIG. 24 below, Note Tile Spacers can be inserted under the topmost Note Tiles—giving support where they may otherwise have no support. Said Spacers are the same thickness as the Note Tiles, and have tiny corner magnets on their front and back sides; when they are sandwiched between upper and lower Note Tiles, they insure magnetic adhesion between them both.

Figure 24:
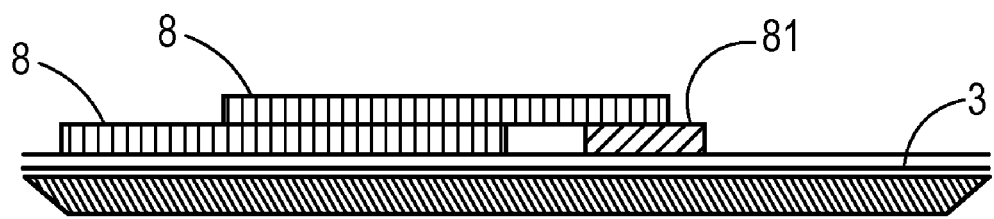
FIG. 24 is a side schematic view of a note tile spacer shown between two note tiles, according to an embodiment of the technology described herein.

Referring now to FIG. 24, a tile spacer is shown between tow note tiles. Shown is a side view of two Quarter Note Tiles 8 stacked on a Four-Four Measure with Spacer 81 inserted under the top Note Tile so that the Note Tiles remain in place and are less prone to sliding away from their intended position when the system is transported or mounted vertically onto a wall surface.

Figure 25:
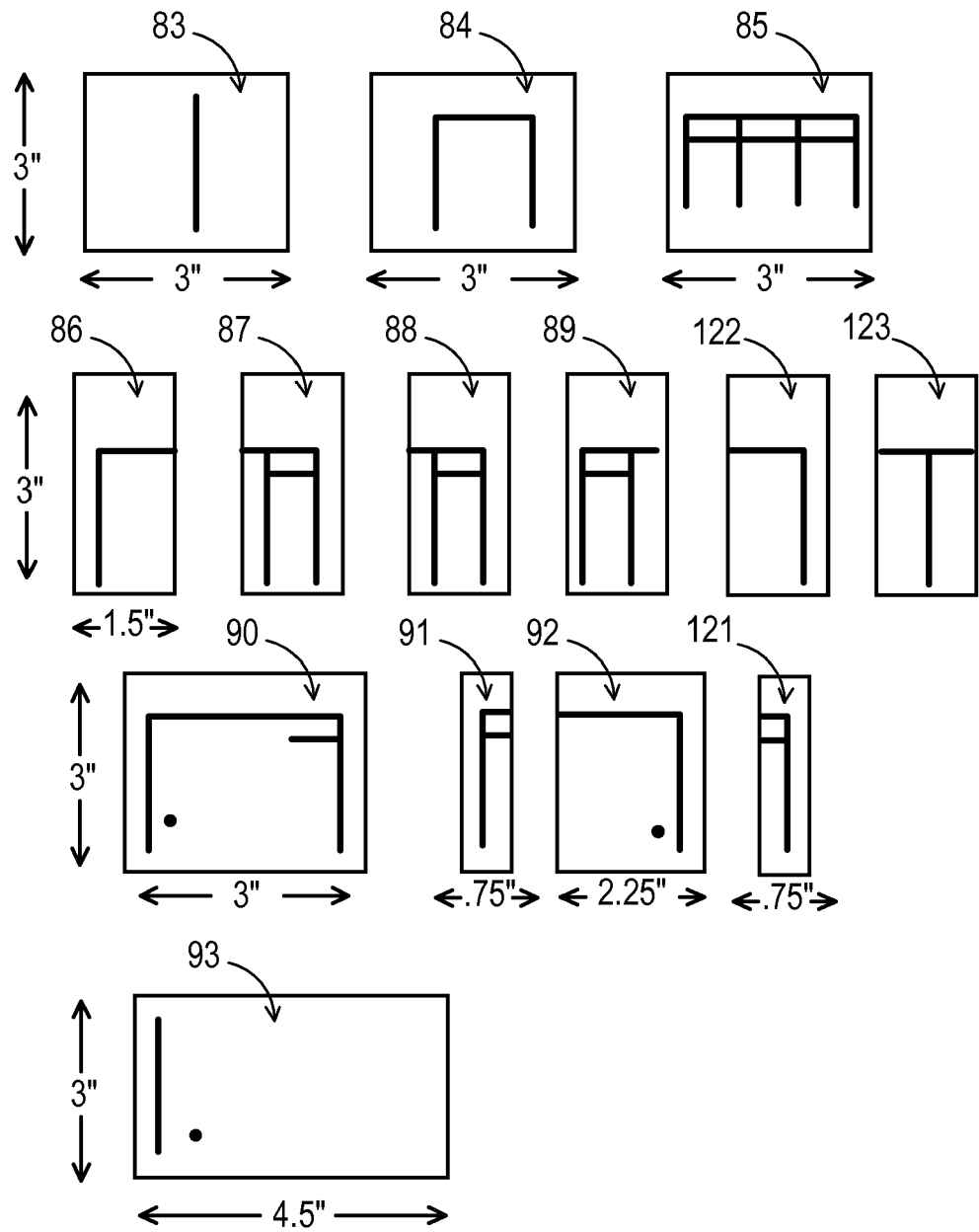
FIG. 25 is a front schematic view of simplified modular stick note tiles, according to an embodiment of the technology described herein.

Referring now to FIG. 25, simplified modular stick note tiles are shown. Shown are Simplified Note Tiles that have the black solid noteheads removed so that users may focus on note stems and beams—the most important aspects of rhythmic notations for all notes except the whole, half and dotted half notes. Note Tile numbers 83, 84, 85, and 90 show simplified note arrangements commonly seen in Kodaly and Orff music methodologies. Unlike those latter arrangements, which are usually hand-written and self-produced on opaque cardboard or paper, the Simplified Modular Stick Note Tiles in FIG. 25 are made with durable, transparent tiles. Moreover, unlike prior art, all the note combinations seen in numbers FIG. 25 are modular and interchangeable. With this notation system users are able to quickly and accurately build beamed eighth and sixteenth note combinations by placing them on any Rhythmic Measure Plaque FIG. 11, 13 or 15. They can easily see how the note combinations add up to one Beat Unit 30a or one measure—that is the entire area between Bar Lines 4. When young users use these tiles as manipulatives, they intuitively grasp the mathematical principals of ratios and proportions, concepts that would otherwise be lost on them if those concepts were explained by paperwork and lectures alone. 83 is a Quarter Note Tile without a notehead. 84 is a two Eighth Notes Tile without a notehead. 85 is a 4 Sixteenth Notes Tile without noteheads. 86 is an Eighth Note on left side of a beam without a notehead. 87 is Two $\frac{1}{16}$ Notes on right side of a beam without noteheads. 88 is an Eighth Note on right side of a beam without a notehead. 89 is two $\frac{1}{16}$ Notes on left side of a beam without noteheads. 90 is a dotted eighth note beamed to a $\frac{1}{16}$ Note without noteheads. 91 is one $\frac{1}{16}$ note on left side of a beam without a notehead. 92 is a dotted eighth note on right side of beam without a notehead. 93 is a dotted quarter note without a notehead. 121 is the right side of a beamed $\frac{1}{16}$ note without a notehead. 122 is the right side of a beamed $\frac{1}{8}$ note without a notehead. 123 is a center-beamed $\frac{1}{8}$ note without a notehead.

Figure 26:
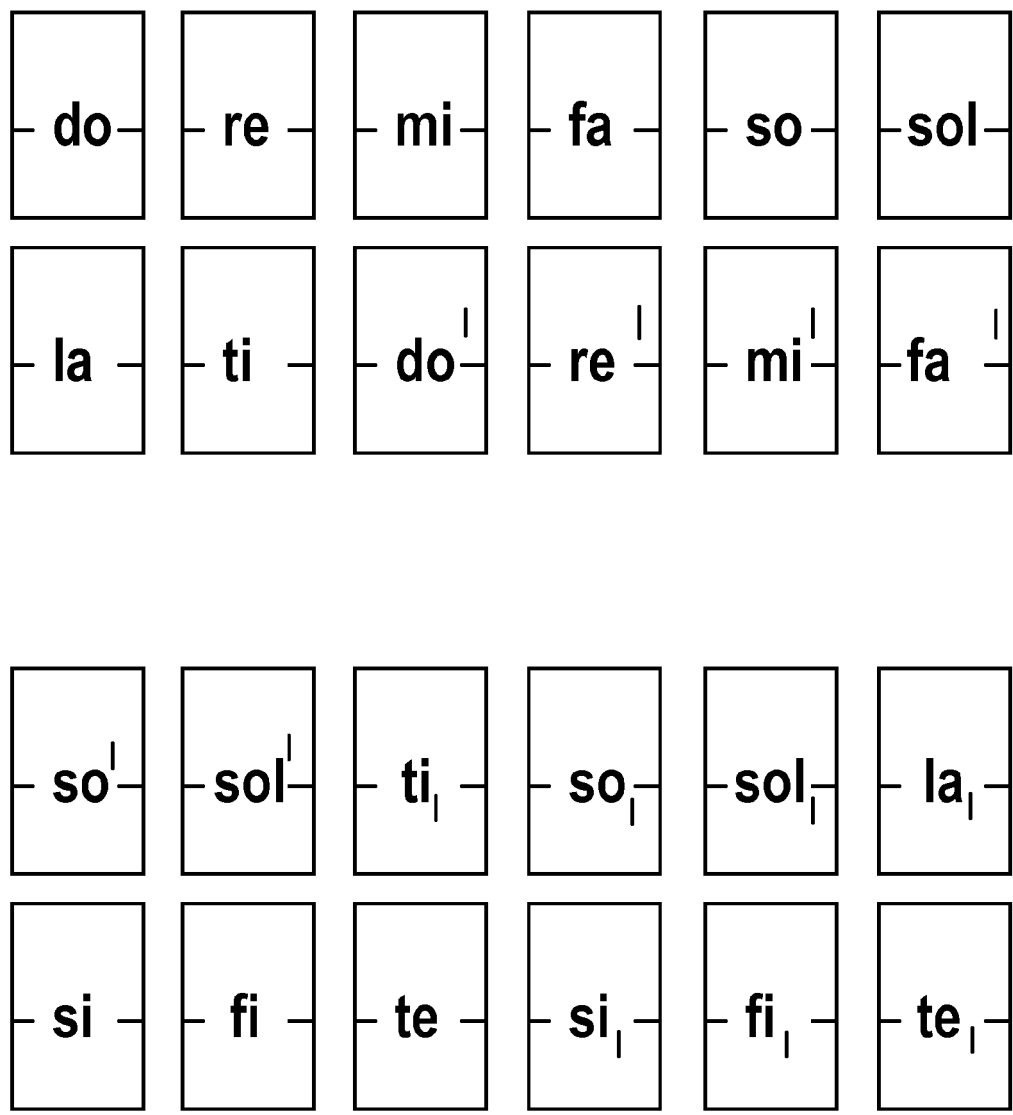
FIG. 26 is a front schematic view of solfeggio labels, according to an embodiment of the technology described herein.

Referring now to FIG. 26, Solfeggio labels are depicted. Shown are the Solfeggio syllables that music educators frequently use to aurally denote the intervals of scales and modes in music (sometimes known by laymen as the do-re-mis). These removable labels can be pressed onto any of said Note Tiles to indicate the relative pitches of rhythmic notes. Users who have memorized Solfeggio intervals can quickly place these under any of the aforesaid Note Tiles to reveal melodies. In so doing a user may indicate or compose a melodic passage based on intervals, without the added difficulties of quickly reading the names of the staff lines.

The small mark or apostrophe (') on the upper right hand side of the Solfeggio syllable indicates that the tone should be sung or played an octave higher than the unmarked syllable. For example, do' is an octave higher than the unmarked do.

Similarly, the mark on the lower right-hand side of the Solfeggio syllable means that one should sing or play his/her instrument 1 octave below the unmarked syllable. For example, ti signifies that one plays or sings the ti pitch that is an octave lower than regular ti.

Figure 27:
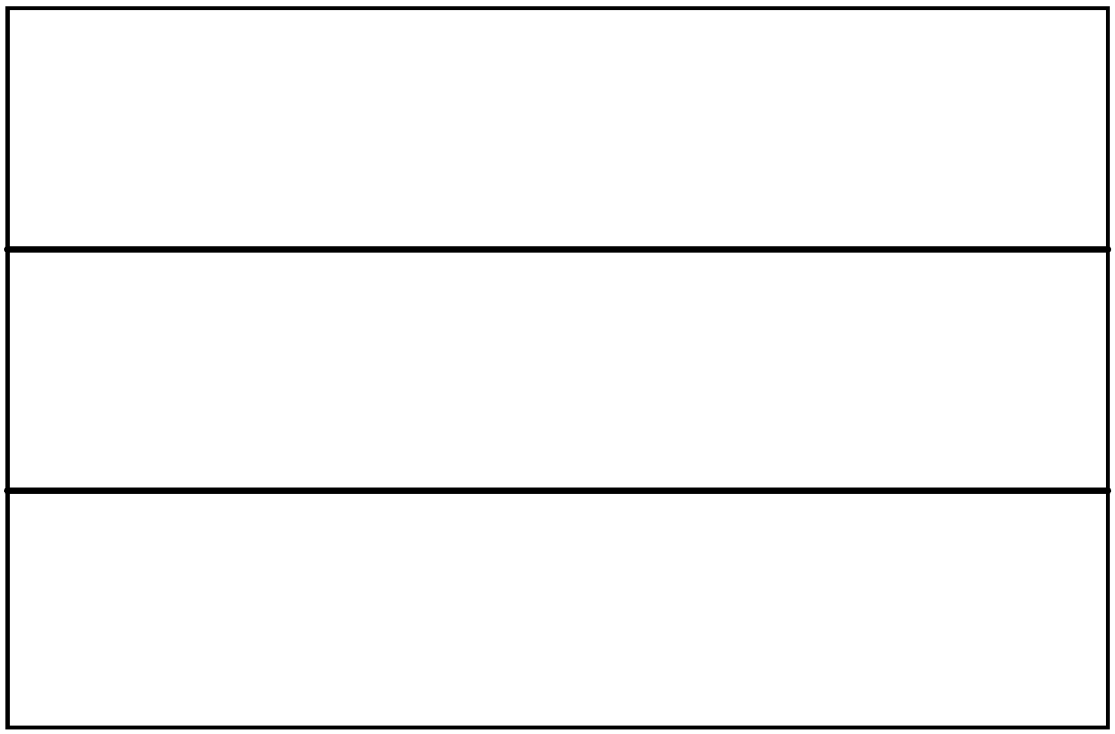
FIG. 27 is a front schematic view of a simplified staff measure plaque, according to an embodiment of the technology described herein.

Referring now to FIG. 27, a simplified staff measure plaque is shown. Shown is a two-line stave, cropped version of the common five-line stave. Beginning users are frequently overwhelmed with the five lines and four spaces of the common stave. Using this Simplified Staff Measure Plaque, users can place any of the aforesaid Note or Icon Tiles and Solfeggio Labels to create very simple compositions. In thus simplifying the parameters of their compositions, beginning users are much more likely to be successful in creating compositions.

Figure 28:
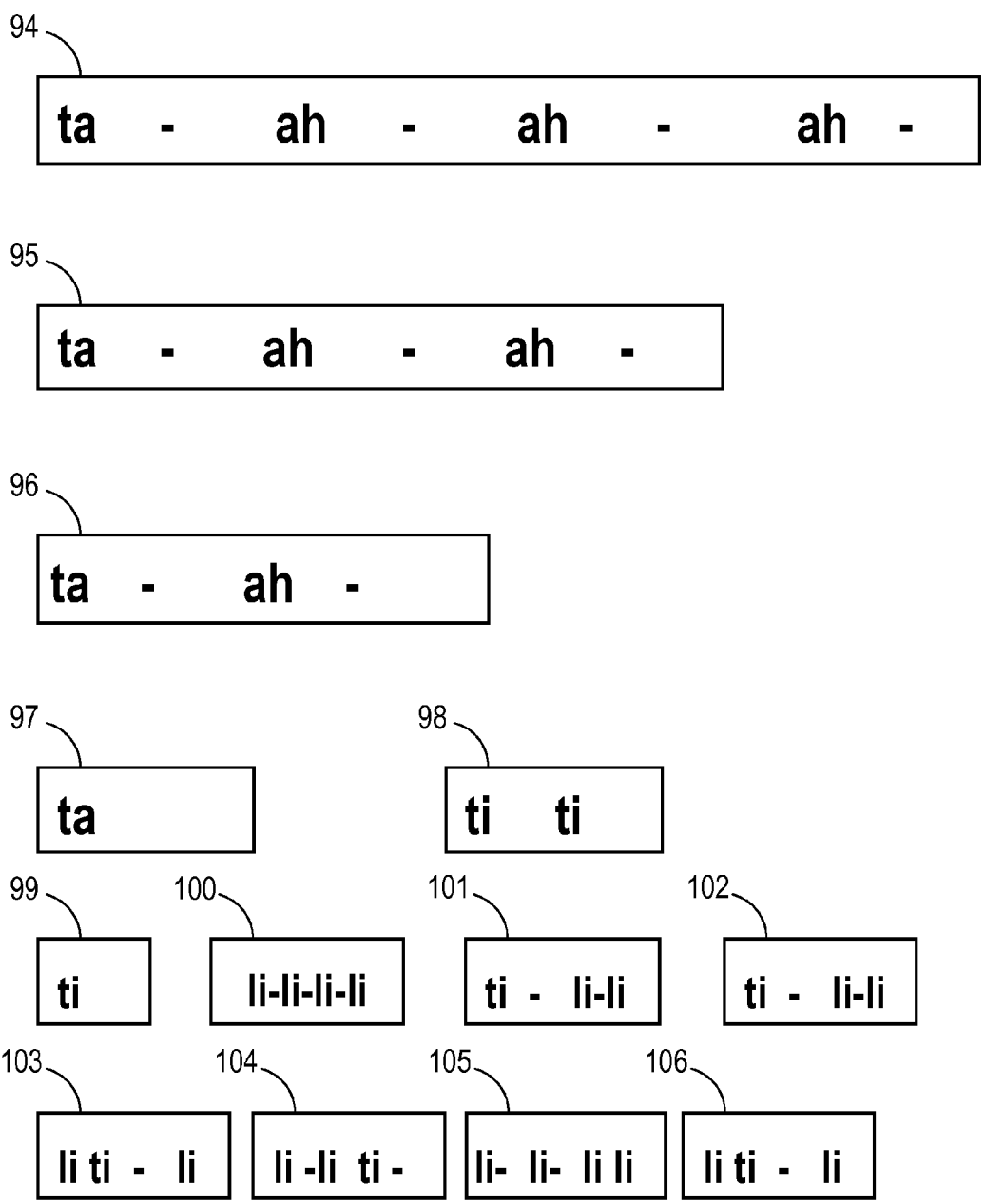
FIG. 28 is a front schematic view of Kodaly and Rose syllabic labels, according to an embodiment of the technology described herein.

Referring now to FIG. 28, Kodaly and Rose syllabic labels are shown. Shown are static cling-type Labels that can be pressed temporarily to any said Rhythm Note Tile, Measure Plaque or Platform. The to and ti-ti syllables are a common method of syllabicating rhythmic notations in Kodaly and Orff methodologies.

This notation system's syllabication method differs from prior art in this way: Prior art methods, primarily those of the Kodaly and Orff traditions, often use tikitaki or tiritiri to approximate the sounds of four $\frac{1}{16}$ notes (seen in 10a and 10b). When students are taught to say tikitaki for four $\frac{1}{16}$ notes, the first $\frac{1}{16}$ note receives the syllable ti. When students are taught to say tiritiri the first and third $\frac{1}{16}$ notes are syllabicated as ti. A student of these traditions paradoxically learns that paired eighth notes should be sounded as ti-ti. Thus in some instanced they must say ti for ⅛ notes and in other cases they must say ti for ¹⁄₁₆ notes. The system becomes much more confusing when combinations of sixteenth and eighth notes are presented to students.

The method disclosed herein, in contrast to these methods, is to denote di (or li) for all ¹⁄₁₆ notes which would make all syllables always consistent. A di (or li) will always be a ¹⁄₁₆ note in this system, no matter the configuration of the components, and ti will always refer to an eight note.

Finally, in Labels 102, 103, and 105 one sees light gray-toned syllables. These gray syllables stand for notes that are felt but not articulated, as would be found with tied notes.

A syllabication of a whole note is shown in 94. A syllabication of a dotted half note is shown in 95. A syllabication of a half note is shown in 96. A syllabication of a quarter note is shown in 97. A syllabication of two-eighth notes is shown in 98. A syllabication of an eighth note is shown in 99. A syllabication of four ¹⁄₁₆ notes, numbers 10b and 85 is shown in 100. A syllabication of an ⅛ note beamed to two ¹⁄₁₆ notes, 11 and 12a or 12b, or 86 and 87 is shown in 101. A verbal syllabication of a dotted ⅛ note, 16, and a ¹⁄₁₆ note, 13, as seen together in Note Tile 23 is shown in 102. A syllabication of a ¹⁄₁₆ note beamed to a dotted ⅛ note, shown as 22c and 25a, or 13 and 16 is shown in 103. A syllabication of two ¹⁄₁₆ notes, 12a or 12b, or 22c and 22b, next to an eighth note 11 or 25 is shown in 104. A syllabication of 22a and 22b, 23, or 10b wherein the first three ¹⁄₁₆ notes are tied together, leaving only the first and last ¹⁄₁₆ notes to be enunciated is shown in 105. A syllabication of a ¹⁄₁₆ note, an eighth note and a ¹⁄₁₆ note is shown in 106.

Figure 29:
FIG. 29 is a front schematic view of blank labels, according to an embodiment of the technology described herein.
Figure 29:
Figure 29:
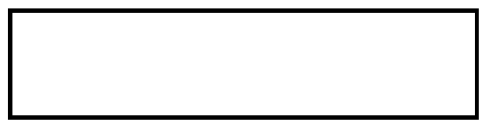
Figure 29:
Figure 29:
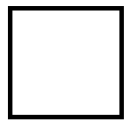

Referring now to FIG. 29, blank labels are shown. Shown are blank Labels, similar to those in FIG. 28, that is, of clear, static-cling material, of the same lengths. Users are thus able to write their own syllabications or words for the aforesaid Note Tiles and Measure Plaques. Further, these blank Labels can be used for song writing, enabling users to write lyrics above or below the Note Tiles.

Figure 30:
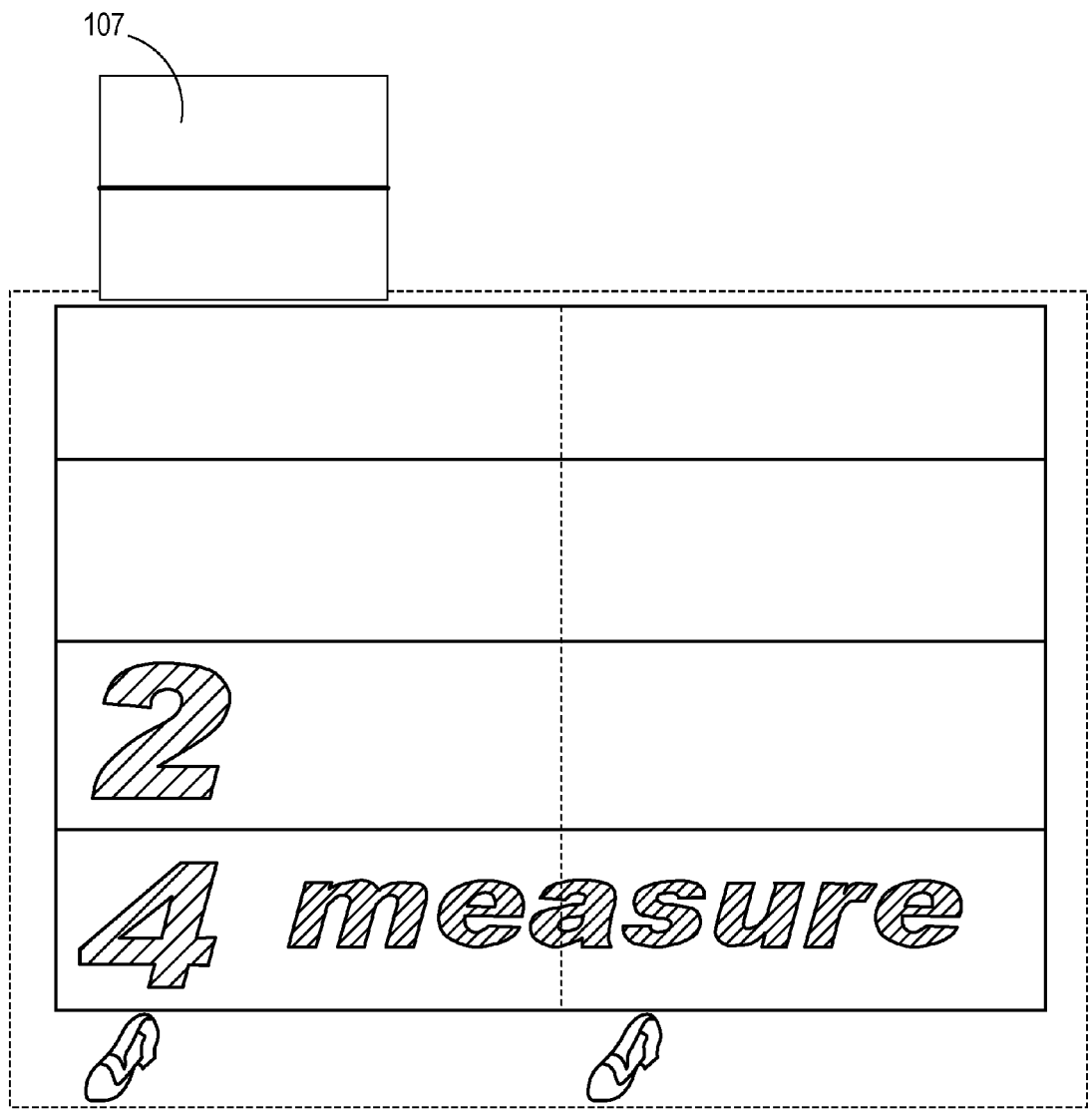
FIG. 30 is a front schematic view of a ledger line plaque, according to an embodiment of the technology described herein.

Referring now to FIG. 30, a ledger line plaque is shown. Shown is Ledger Line Plaque FIG. 30, placed above Measure Plaque FIG. 16. The Ledger Line Plaque allows Note Tiles to be placed above or below a stave, allowing note tile placement of very high or very low notes on an as-needed basis.

Referring now to FIG. 31, a grand staff brace 108 and staff extension plaque 109 are shown. The Grand Staff Brace Label 108 connects the treble and bass staves into one system. The brace is usually seen in piano music and combines bass and treble staves into a grand staff system. Shown also is Staff Extension Plaque 109. This Plaque can be used to create additional space, as might be needed before or after a Melodic Measure Plaque. The Staff Extension Plaque 109 can be abutted, either before or after, a staved Measure Plaque. Symbols such as the Treble Clef or Bass Clef from FIGS. 20 and 21 can also be placed on the face of Staff Extension Plaque, as seen in FIG. 31.

Referring now to FIG. 32, a bracket label with multiple voicings and measure and spacer plaques are shown. The Bracket Label 109 is a connecting device used to inform the user that several voicings or staves are meant to be read simultaneously, as in multi-voiced ensemble, choral, orchestral, band and symphonic literature. The Bracket Label 109 is made of pliable materials, such as vinyl static cling, and is comprised of durable sections that can be telescoped or vertically abutted to each other when additional staves are added.

Figure 33:
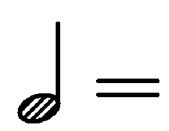
FIG. 33 is a front schematic view of tempo labels, according to an embodiment of the technology described herein.
Figure 33:
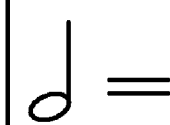
Figure 33:

Referring now to FIG. 33, tempo labels are shown. Shown are transparent cling-type labels that a user can append to a composition—either above any Measure Plaque, onto a Platforms 76, or onto any white boards. The shown Tempo Labels are placed by a user at the beginning of a musical composition (or section) to reveal the tempo or speed with which the music is intended to be played. The Labels in the lower portion of FIG. 33 that display a note followed by an equal mark (=) are precise Tempo Labels, in which a user writes a number with a dry erase marker on the right side of the equal mark (=), and in so doing, indicates the number of beats per minute that the composition should be played. The Quarter, Half or Eighth notes inscribed on the left side of the equal mark indicates the type of note that should receive one beat.

Figure 34:
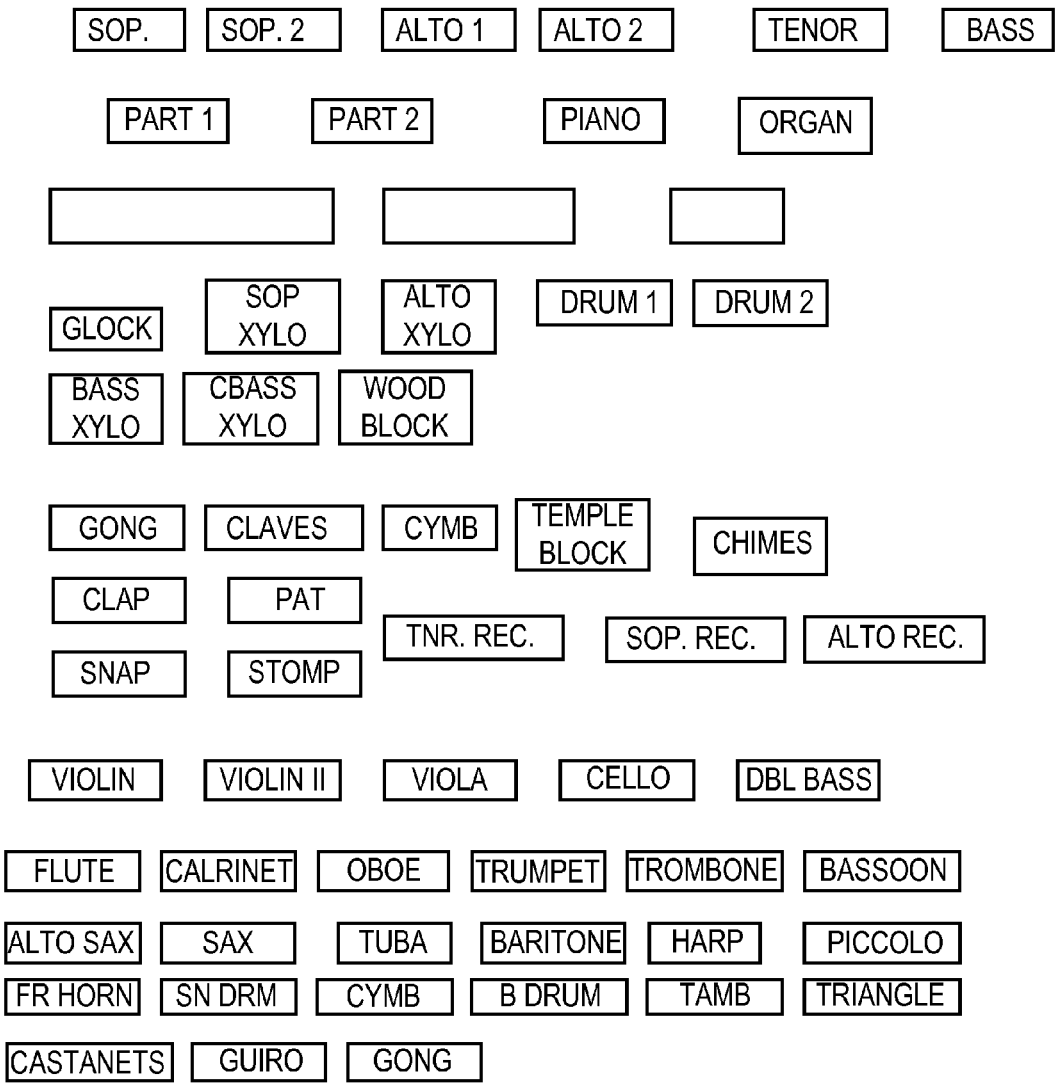
FIG. 34 is a front schematic view of a voicings and instrument labels, according to an embodiment of the technology described herein.

Referring now to FIG. 34, voicings and instrument labels are shown. Seen are labels for various common voicings and instruments used in music classrooms. These cling-type labels are transparent and are appended to the Platform immediately to the left of the initial Measure Plaque in a composition, as seen in FIG. 32. Included are blank labels for the denotation of other instruments not included in FIG. 34. A user may apply new voicings by attaching transparent labels to the surface or hand-writing in the instruments with Vis-à-vis type or dry erase pens.

Referring now to FIG. 35, note tiles and labels on measure plaques and platforms is demonstrated. Shown is a demonstration of how the system might work using multiple Measure Plaques, Staff Extension Plaques, Note Tiles, Bracket Labels and Clef Labels. A Whole Note Tile 1 is shown. A 4-4 Melodic Measure Plaque 3 is shown. A Half Note Stem Up Tile 7 is shown. A Quarter Note Tile 8 is shown. Two Eighth Note Stems Up Tiles 9 are shown. Platform 76 is shown. Lip 77 supports and align Measure Plaques, Notes and Symbols. Six-Eight Rhythm Measure Plaques are shown.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the technology described herein and are intended to be covered by the following claims.

What is claimed is:

1. A music note tile used to teach music notation and composition, the note tile comprising:
    a transparent tile to teach music notation and composition, the music note tile configured with at least one musical note representation disposed opaquely upon the transparent tile and adapted for operative manipulation by a user and placement upon a measure plaque having a rhythmic side and a melodic side into a correct musical position such that, on the melodic side of the measure plaque, the music note tile overlays either a staff line or space, and on the rhythmic side of the measure plaque, the music note tile is positioned between flanking bar lines, wherein the music note tile is mathematically proportionate in size to a relative length of a sound duration represented by the at least one musical note inscribed on the music note tile.

2. The music note tile of claim 1, further comprising:
    at least one magnet disposed upon the music note tile on a back side of the music note tile and placed directly behind an opaque note area and adapted to couple the music note tile securely to the measure plaque.

3. The music note tile of claim 2, further comprising:
    a hole disposed within a back side of the transparent tile and adapted for placement of the at least one magnet within the hole such that the at least one magnet is flush with the music note tile.

4. The music note tile of claim 1, wherein the transparent tile is manufactured of a very thin transparent material such that the transparent tile has a thickness of seven millimeters or less and is adapted to adhere to the measure plaque, a projector, or a dry-erase board, with static cling.

5. The music note tile of claim 1, further comprising:
at least one transparent texture strip disposed upon a back side of the music note tile and adapted to prevent rotation of the music note tile on the measure plaque, and to maintain alignment of the music note tile.

6. The music note tile of claim 1, further comprising:
at least one engraving disposed within the music note tile on a surface where the at least one opaque musical note representation is placed, such that a note shape also is identifiable by sight-impaired and kinesthetic persons.

7. The music note tile of claim 1, further comprising:
at least one horizontal dotted line locating bracket, the at least one horizontal dotted line locating bracket disposed upon a right or left edge of the music note tile; and
at least one horizontal solid line locating strip, the at least one horizontal solid locating strip disposed upon a right or left edge of the music note tile;
wherein the at least one horizontal dotted line locating bracket and the at least one horizontal solid line locating strip are configured to assist the user in a placement of the music note tile upon staff lines and spaces of the measure plaque.

8. A system to teach music notation and composition, the system comprising:
a plurality of two-sided measure plaques, each measure plaque having a rhythmic side configured with a time signature, a plurality of beat delineation lines, a plurality of beat units, and a plurality of icons to represent where each beat begins and ends, the rhythmic side adapted for building rhythmic compositions without tonal variations, and a melodic side configured, additionally, with five staff lines and four spaces, the melodic side adapted for building melodic compositions; and
a plurality of transparent tiles to teach music notation and composition, the tiles configured with at least one musical note representation disposed upon the transparent tile and adapted for operative manipulation by a user and placement upon the melodic side of a measure plaque into a correct musical position such that the tile overlays either a staff line or space on the measure plaque or upon the rhythmic side of the measure plaque between flanking bar lines, wherein the tile is mathematically proportionate in size to a relative length of a sound duration represented by the at least one musical note inscribed on the tile.

9. The system of claim 8, wherein each measure plaque comprises a magnetic front and a magnetic back surface, and wherein each transparent note tile comprises a magnet to adhere to one of the measure plaques.

10. The system of claim 8, further comprising:
a staff extension plaque configured to add additional staff space to the measure plaque.

11. The system of claim 8, further comprising:
a grand staff brace label configured to join a bass stave and a treble stave into a single system.

12. The system of claim 8, further comprising:
a magnetic platform adapted to receive the measure plaques, the note tiles, at least one staff extension plaque, and at least one label.

13. The system of claim 12, further comprising:
a lip disposed upon the magnetic platform adapted to support the measure plaques, the note tiles, the at least one staff extension plaque, and the at least one label.

14. The system of claim 8, further comprising:
a plurality of magnetic platforms adapted to receive the measure plaques, the note tiles, at least one staff extension plaque, and at least one label; and
at least one bridge configured to join a pair of magnetic platforms.

15. The system of claim 8, further comprising:
a plurality of spacer tiles, each spacer tile adapted for use between note tiles and to support and level note tiles.

16. The system of claim 8, further comprising:
a plurality of pre-reading tiles, each pre-reading tile having an image adapted for view by a pre-reader or emerging reader, wherein the image represents a pneumonic symbol.

17. The system of claim 8, further comprising:
a plurality of symbol labels adapted for adherence to the measure plaque, each label indicative of a musical term.

18. The system of claim 8, further comprising:
a plurality of Solfeggio labels.

19. A method to teach music notation and composition, the method comprising:
providing a plurality of two-sided measure plaques, each measure plaque having a first side configured with a time signature, a plurality of beat delineation lines, a plurality of beat units, and a plurality of icons to represent where each beat begins and ends, the first side adapted for building rhythmic compositions without tonal variations, and a second side configured, additionally, with five staff lines and four spaces, the second side adapted for building melodic compositions;
providing a plurality of transparent tiles to teach music notation and composition, the tiles configured with at least one musical note representation disposed upon each of the transparent tiles and adapted for operative manipulation by a user and placement upon the second side of a measure plaque into a correct musical position such that the tile overlays either a staff line or space on the measure plaque or upon the first side of the measure plaque between flanking bar lines, wherein the tile is mathematically proportionate in size to a relative length of a sound duration represented by the at least one musical note inscribed on the tile; and
utilizing the first side of the measure plaque to compose a rhythmic composition.

20. The method of claim 19, further comprising:
utilizing the second side of the measure plaque to compose a melodic composition.

* * * * *